United States Patent
Suzuki et al.

(10) Patent No.: US 7,439,863 B2
(45) Date of Patent: Oct. 21, 2008

(54) RFID RELAY ANTENNA, RFID SYSTEM, CONTAINER, DISPOSITION METHOD, COMMUNICATION CONFIRMATION METHOD, AND PACKAGE CONSTRUCTION

(75) Inventors: Kenji Suzuki, Ebina (JP); Tomohiro Ono, Ebina (JP); Hiroyuki Yamauchi, Ebina (JP); Toshio Watanabe, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 346 days.

(21) Appl. No.: 11/222,127

(22) Filed: Sep. 8, 2005

(65) Prior Publication Data

US 2006/0208899 A1    Sep. 21, 2006

(30) Foreign Application Priority Data

Mar. 7, 2005   (JP)   .............................. 2005-062686

(51) Int. Cl.
 *G08B 13/14*   (2006.01)
(52) U.S. Cl. .................................... 340/572.7; 343/731
(58) Field of Classification Search .............. 340/572.7, 340/572.1; 343/731, 742, 743, 893
 See application file for complete search history.

(56) References Cited

U.S. PATENT DOCUMENTS

| 5,270,717 | A | 12/1993 | Schuermann | |
|---|---|---|---|---|
| 6,844,859 | B2 * | 1/2005 | Noda et al. | 340/572.1 |
| 7,126,552 | B2 * | 10/2006 | Locatelli et al. | 343/731 |
| 2001/0052544 | A1 | 12/2001 | Nishitani et al. | |
| 2003/0214546 | A1 | 11/2003 | Hatasa et al. | |
| 2003/0214774 | A1 | 11/2003 | Locatelli et al. | |
| 2004/0135691 | A1 | 7/2004 | Duron et al. | |

FOREIGN PATENT DOCUMENTS

| GB | 2288103 A | 10/1995 |
|---|---|---|
| GB | 2360422 A | 9/2001 |
| JP | 2001209767 | 8/2001 |
| JP | 2001233410 | 8/2001 |
| JP | 2003300359 | 10/2003 |

OTHER PUBLICATIONS

Korean Office Action dated Nov. 16, 2006, corresponding to Korean Patent Application Serial No. 10-2005-0086147. English translation also enclosed.
Chines Office Action for Chinese Patent Application Serial No. 200510103945.7, with an English translation.
Office Action issued on Feb. 7, 2008 from the European Patent Office for corresponding European Patent Application Serial No. 05 019 626.0—2210.
Office Action issued on Jun. 20, 2008 from the Taiwan Patent Office for corresponding Taiwan Patent Application, with English translation.

* cited by examiner

*Primary Examiner*—John A Tweel, Jr.
(74) *Attorney, Agent, or Firm*—Gauthier & Connors LLP

(57) ABSTRACT

In an RFID system including an RFID tag and an RFID reader for performing wireless communications with the RFID tag, an RFID relay antenna has a first loop antenna for electromagnetic induction coupling with an antenna at the RFID tag, a second loop antenna that is provided apart from the first loop antenna and for electromagnetic induction coupling with an antenna at the RFID reader, and wires for connecting the first loop antenna and the second loop antenna so as to form one closed loop and for conveying an induced current generated at the first and second loop antennas to the second and first loop antennas, respectively.

15 Claims, 22 Drawing Sheets

RFID RELAY ANTENNA, RFID SYSTEM, CONTAINER, DISPOSITION METHOD, COMMUNICATION CONFIRMATION METHOD, AND PACKAGE CONSTRUCTION

PRIORITY INFORMATION

This application claims priority to Japanese Patent Application No. 2005-062686, filed Mar. 7, 2005, which is incorporated herein by reference in its entirety.

BACKGROUND OF THE INVENTION

1. Field of the Invention

The present invention relates to an RFID (Radio Frequency Identification) tag system including an RFID tag and an RFID reader for performing wireless communications with the RFID tag, an RFID relay antenna used in the RFID system, a container for housing a product to which the RFID tag is attached, a disposition method for containers, a communication confirmation method in the RFID system, and a package construction of the product to which the RFID tag is attached.

2. Description of the Related Art

RFID systems for performing wireless communications between RFID tags and RFID readers have become prevalent in recent years. These RFID systems often utilize the action of electromagnetic induction between tag and reader, such as electromagnetic coupling methods and electromagnetic induction methods.

In the methods utilizing the electromagnetic induction action, the communication range is relatively short, such as several cm in the electromagnetic coupling method and several tens of cm in the electromagnetic induction method. Furthermore, it is necessary for the loop antenna of the RFID tag and the loop antenna of the RFID reader to face each other. Namely, it is necessary for the RFID tag and the RFID reader to face each other in proximity and the degree of freedom in their positional relationship is small. Thus, a technique is desirable to increase the degree of freedom in their positional relationship.

SUMMARY OF THE INVENTION

The present invention is an RFID relay antenna that is used in an RFID system including an RFID tag and an RFID reader that performs wireless communications with the RFID tag, where the RFID relay antenna has a first loop antenna that couples through electromagnetic induction with an antenna at the RFID tag, a second loop antenna that is disposed apart from the first loop antenna and that couples through electromagnetic induction with an antenna at the RFID reader, and wires that connect the first loop antenna and the second loop antenna so as to form one closed loop and that convey an induced current generated at the first and second loop antennas to the second and first loop antennas, respectively.

Furthermore, the present invention is an RFID system having an RFID tag, an RFID reader that performs wireless communications with the RFID tag, and an RFID relay antenna having a first loop antenna that couples through electromagnetic induction with an antenna at the RFID tag, a second loop antenna that is disposed apart from the first loop antenna and couples through electromagnetic induction with an antenna at the RFID reader, and wires that connect the first loop antenna and the second loop antenna so as to form one closed loop and that convey an induced current generated at the first and second loop antennas to the second and first loop antennas, respectively, where an electromagnetic wave from the RFID reader, after being converted to an induced current by the second loop antenna, is conveyed to the first loop antenna via the wires, converted to an electromagnetic wave by the first loop antenna, and transmitted toward the RFID tag, an electromagnetic wave from the RFID tag, after being converted to an induced current by the first loop antenna, is conveyed to the second loop antenna via the wires, converted to an electromagnetic wave by the second loop antenna, and transmitted toward the RFID reader.

Furthermore, the present invention is a container that contains a product to which an RFID tag is attached, the container having a third loop antenna that is disposed near the RFID tag and couples through electromagnetic induction with an antenna at the RFID tag, a fourth loop antenna that is disposed on a component surface forming the container and couples through electromagnetic induction with an antenna on the outside of the container, and wires that connect the third loop antenna and the fourth loop antenna so as to form one closed loop and that convey an induced current generated at the third and fourth loop antennas to the fourth and third loop antennas, respectively.

BRIEF DESCRIPTION OF THE DRAWINGS

Embodiments of the present invention will be described in detail based on the following figures, wherein.

DETAILED DESCRIPTION OF THE PREFERRED EMBODIMENTS

Embodiments of the present invention will be described hereinafter with reference to the attached figures.

First Embodiment

Figure 1:
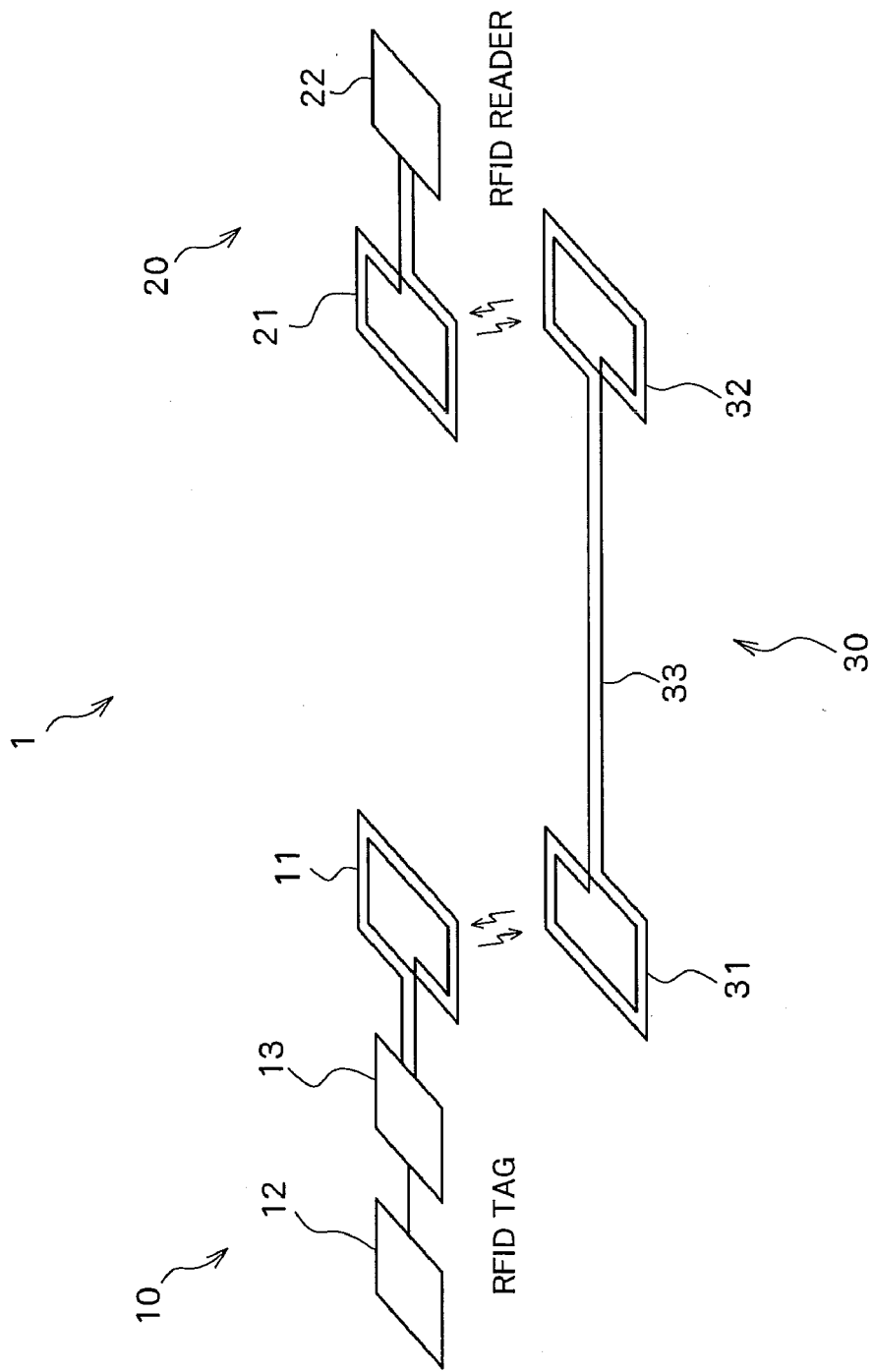
FIG. 1 is a schematic diagram showing the configuration of an RFID system relating to a first embodiment.

FIG. 1 is a schematic diagram showing the configuration of an RFID system 1 relating to this embodiment. The RFID system 1 utilizes the action of electromagnetic induction to perform non-contact reading and writing of data with respect to memory. As in ordinary RFID systems, the RFID system 1 in FIG. 1 has an RFID tag 10 (referred to hereinafter as "tag") and an RFID reader 20 (referred to hereinafter as "reader"). Existing products can be used for the tag 10 and the reader 20. Furthermore, the specifications for the tag 10 and the reader 20, such as power supply method to the tag (passive or active), communications protocol, modulation method, transmission speed, and so forth, may be appropriately set.

The tag 10 is a wireless IC chip called an IC tag or wireless tag and has a tag antenna 11, a memory 12, and a control circuit 13.

The tag antenna 11 is a loop antenna, which is a wire that has been formed into a coil shape, and receives incoming electromagnetic waves from the outside and emits electromagnetic waves outward.

The memory 12 is a non-volatile semiconductor memory for storing predetermined information, such as information regarding a product to which the tag 10 has been attached. The memory 12 may be a read-only memory (ROM) or a read/write memory, such as an EEPROM (Electrically Erasable Programmable Read-Only Memory).

The control circuit 13 executes predetermined processes, such as communications, memory access, power conversion, and so forth. More specifically, the control circuit 13 obtains received data by demodulating a signal that is received from the tag antenna 11. On the basis of the received data that is obtained, the control circuit 13 creates transmit data to be transmitted to the reader 20, modulates the transmit data, and transmits the obtained transmit data outward from the tag antenna 11. Furthermore, on the basis of the receive data, the control circuit 13 executes a process, such as reading data from the memory 12 or writing data to the memory 12.

The reader 20 is a communication-device for performing wireless communications with the tag 10 to access the memory 12. Here, the reader 20 may be a reader device for reading data from the memory 12 or a reader/writer device for reading and writing data with respect to the memory 12. The reader 20 has a reader antenna 21 and a control circuit 22.

The reader antenna 21 is a loop antenna, which is a wire that has been formed into a coil shape, and receives incoming electromagnetic waves from the outside and emits electromagnetic waves outward.

The control circuit 22 executes predetermined communication processes. More specifically, the control circuit 22 creates transmit data to be transmitted to the tag 10, modulates the transmit data, and transmits the obtained transmission signal outward from the reader antenna 21. Furthermore, the control circuit 22 demodulates the signal that is received from the reader antenna 21 and executes the appropriate process on the basis of the received data that is obtained.

The tag 10 and the reader 20 having the above-mentioned configuration may be enabled for direct communication as in an ordinary RFID system. However, for direct communications between them, it is necessary to arrange the tag antenna 11 and the reader antenna 21 so as to face each other in proximity, thus, the degree of freedom in the positional relationship of the tag 10 and the reader 20 is small.

Accordingly, in this embodiment, an RFID relay antenna 30 (referred to hereinafter as "relay antenna") is provided between the tag 10 and the reader 20 for relaying the transmission and reception of electromagnetic waves between them. The configuration of the relay antenna 30 will be described hereinafter.

As shown in FIG. 1, the relay antenna 30 has a first antenna 31, a second antenna 32, and wires 33.

The first antenna 31 is a loop antenna, which is a wire that has been formed into a coil shape. The first antenna 31 is for electromagnetic induction coupling with the loop antenna at the tag 10 and is arranged so as to face in proximity the loop antenna (tag antenna 11 in FIG. 1) at the tag 10.

The second antenna 32 is a loop antenna, which is a wire that has been formed into a coil shape, and is provided apart from the first antenna 31. The second antenna 32 is for electromagnetic induction coupling with the loop antenna at the reader 20 and is arranged so as to face in proximity the loop antenna (reader antenna 21 in FIG. 1) at the reader 20.

The wires 33 connect the first antenna 31 and the second antenna 32 so as to form one closed loop. In FIG. 1, the wires 33 are a pair of wires to connect the ends of the first antenna 31 and the second antenna 32 together. The first antenna 31, the second antenna 32, and the wires 33 form a unicursal wire circuit.

The specific configuration of the relay antenna 30, such as the shape and dimension of each part of the relay antenna 30 and the number of turns of the antenna coil, may be appropriately set with consideration given to the coupling of various parts, impedance matching, resonance frequency, and so forth. Furthermore, other components, such as a capacitor, may be added to the relay antenna 30. Furthermore, the relay antenna 30 may be formed on an appropriate supporting substrate, such as a plastic board or flexible sheet, by screen printing or etching, or may be formed from only a wire.

In the RFID system 1 having the above-mentioned configuration, the transmission and reception of signals between the tag 10 and the reader 20 are performed via the above-mentioned relay antenna 30 in the manner below.

When a signal is sent from the reader 20 to the tag 10, the reader 20 transmits an electromagnetic wave from the reader antenna 21. This electromagnetic wave is converted into an induced current at the second antenna 32 by electromagnetic induction action. This induced current is conveyed to the first antenna 31 by the wires 33. The conveyed induced current is converted into an electromagnetic wave by the first antenna 31 and transmitted outward. This electromagnetic wave is converted into an induced current at the tag antenna 11 by electromagnetic induction action, and received as an electric signal by the control circuit 13 of the tag 10.

When a signal is sent from the tag 10 to the reader 20, the tag 10 transmits an electromagnetic wave from the tag antenna 11. This electromagnetic wave is converted into an induced current at the first antenna 31 by electromagnetic induction action. This induced current is conveyed to the second antenna 32 by the wires 33. The conveyed induced current is converted into an electromagnetic wave by the second antenna 32 and transmitted outward. This electromagnetic wave is converted into an induced current at the reader antenna 21 by electromagnetic induction action, and received as an electric signal by the control circuit 22 of the reader 20.

The action of the above-mentioned RFID system 1 was confirmed by an actual verification test and its result will be given under "example" to be described hereinafter.

Figure 2:
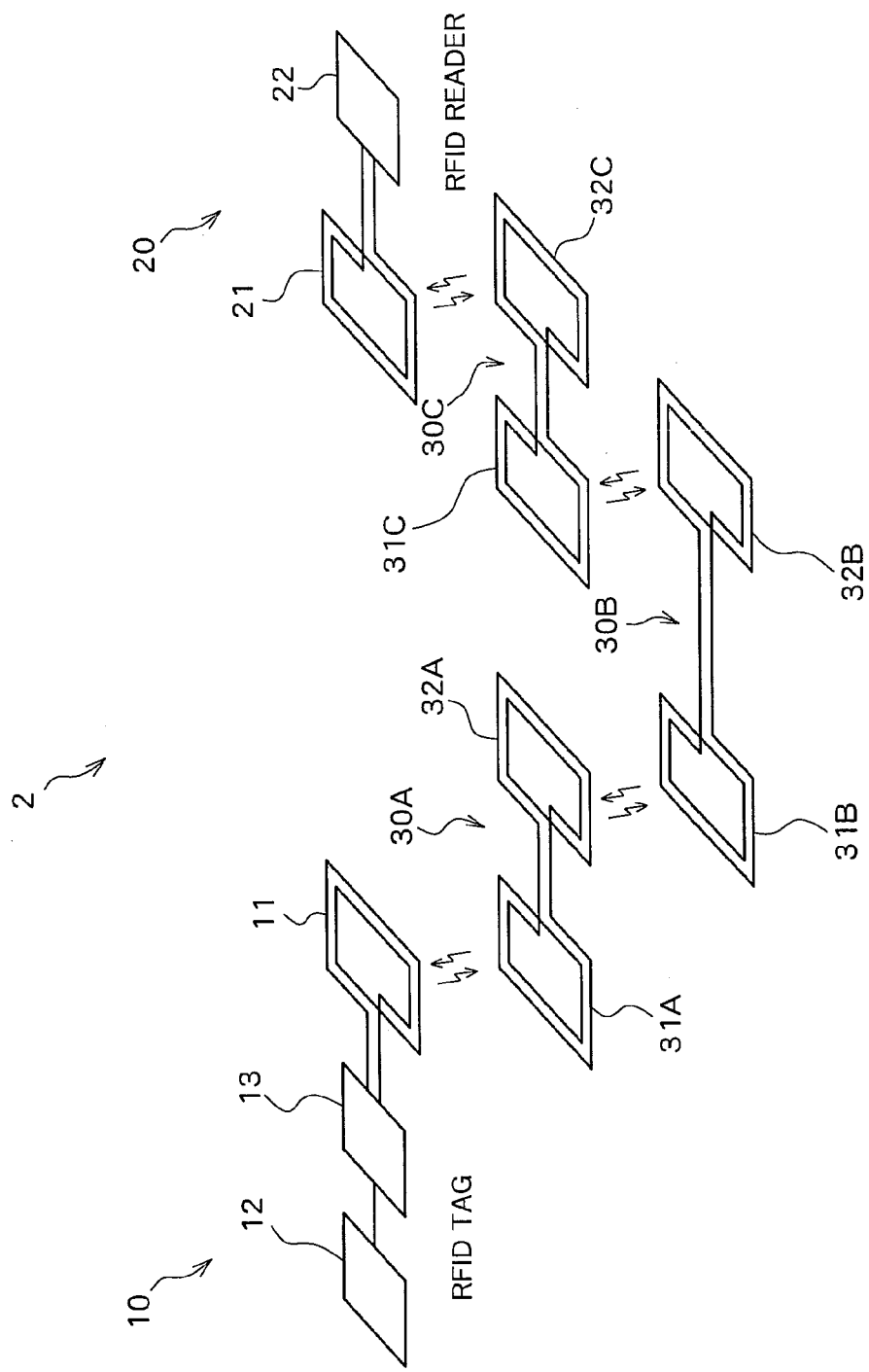
FIG. 2 is a schematic diagram of the RFID system having three relay antennas.

Multiple relay antennas 30 may be provided between the tag 10 and the reader 20. For example, in FIG. 2, a schematic diagram of an RFID system 2 having three relay antennas 30A, 30B, 30C is shown. In FIG. 2, the signal that is transmitted from the reader 20 is transferred in succession to the tag 10 by the relay antennas 30C, 30B, 30A. Taking note of the relay antenna 30B, a first antenna 31B is coupled through electromagnetic induction with a second antenna 32A of the relay antenna 30A as an antenna at the tag 10, and a second antenna 32B is coupled through electromagnetic induction with a first antenna 31C of the relay antenna 30C as an antenna at the reader 20.

As described above, according to the relay antenna 30 relating to this embodiment, since the first antenna 31 and the second antenna 32 are respectively coupled through electromagnetic induction with the antenna at the tag 10 and the antenna at the reader 20, and the wires 33 respectively convey the induced currents generated at the first antenna 31 and the second antenna 32 to the second antenna 32 and the first antenna 31, the wireless communications between the tag 10 and the reader 20 can be relayed.

Furthermore, the relay antenna 30 is formed from antenna coils and wires so as to obviate the need for expensive parts, such as IC chips. Thus, according to the relay antenna 30 relating to this embodiment, the wireless communications between the tag 10 and the reader 20 can be relayed with an extremely simple configuration and at low cost.

Furthermore according to the relay antenna 30, the electromagnetic wave from the tag 10 or the reader 20 is converted into an induced current and conveyed by wires as an electric signal so that the energy loss over the transmission path can be reduced. Thus, the communication range can be substantially increased.

Furthermore, in the RFID system 1 relating to this embodiment, the wireless communications between the tag 10 and the reader 20 are relayed by the relay antenna 30. Thus, they need not be in proximity to each other and the communication range between them can be increased. Furthermore, the restriction of antenna directivity for them is eliminated and the need for arranging them to face each other is obviated. Namely, it is possible to increase the degree of freedom in the positional relationship between the tag 10 and the reader 20.

Furthermore, according to the RFID system 1 relating to this embodiment, since the degree of freedom in the positional relationship between the tag 10 and the reader 20 is increased by the use of the relay antenna 30, existing tags and readers can be utilized for added convenience. Furthermore, this also particularly obviates the need for increasing transmission power.

Furthermore, even in the case where the tag antenna 11 is small and the wireless communication range for the tag 10 itself is short, the wireless communication range (distance from the reader antenna 21 to the antenna at the tag 10) can be extended by increasing the size of the second antenna 32 of the relay antenna 30.

Furthermore, in the case where the tag antenna 11 and the reader antenna 21 have different shapes, the communication efficiency (energy transmission efficiency) in the existing system becomes lower. However, in this embodiment, if the first antenna 31 matches the shape of the tag antenna 11 and the second antenna 32 matches the shape of the reader antenna 21, efficient communications can be performed. Therefore, the shape of the tag antenna 11 and that of the reader antenna 21 are respectively not constrained by the shape of the other. As a result, for example, a standard tag with an antenna having a rectangular shape can be adapted to the reader antenna 21 having various antenna shapes so that a standardization or commonization of tags can be designed. Conversely, a reader provided with an antenna having a standard shape can be adapted to the tag antenna 11 having various antenna shapes so that a standardization or commonization of readers can be designed.

Figure 3:
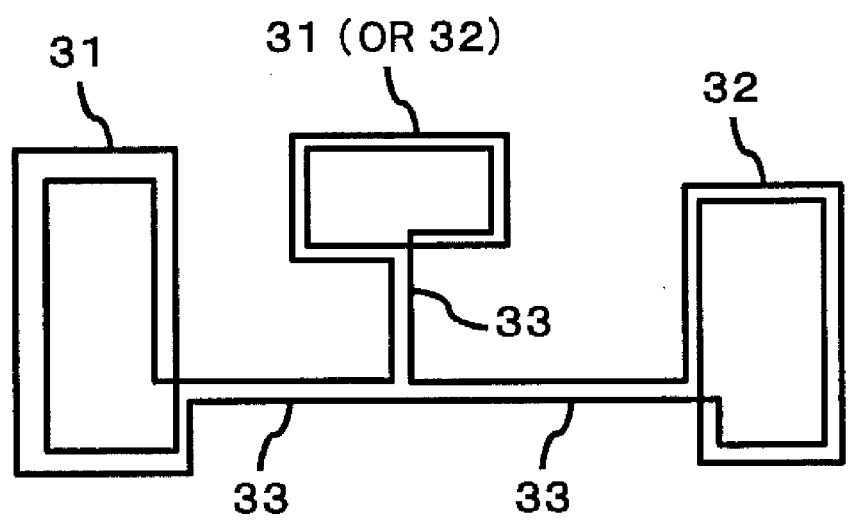
FIG. 3 is a plan view of the relay antenna provided with multiple first antennas (or second antennas)

As shown in FIG. 3, multiple first antennas 31 may be provided apart from each other. In this case, the wires 33 connect the multiple first antennas 31 and the second antenna 32 so as to form one closed loop. According to this configuration, tags 10 in multiple locations can be electromagnetically coupled to the reader 20 with one relay antenna. Thus, for example, it becomes possible to simultaneously access multiple tags 10 installed at multiple locations.

Furthermore, as shown in FIG. 3, multiple second antennas 32 may be provided apart from each other. In this case, the wires 33 connect the multiple second antennas 32 and the first antenna 31 so as to form one closed loop. According to this configuration, readers 20 in multiple locations can be electromagnetically coupled to the tag 10 with one relay antenna. Thus, for example, it becomes possible to access one tag 10 from multiple locations and directions.

Furthermore, the first antenna 31 and the second antenna 32 in the relay antenna may be each provided in multiple quantities.

Second Embodiment

Figure 4:
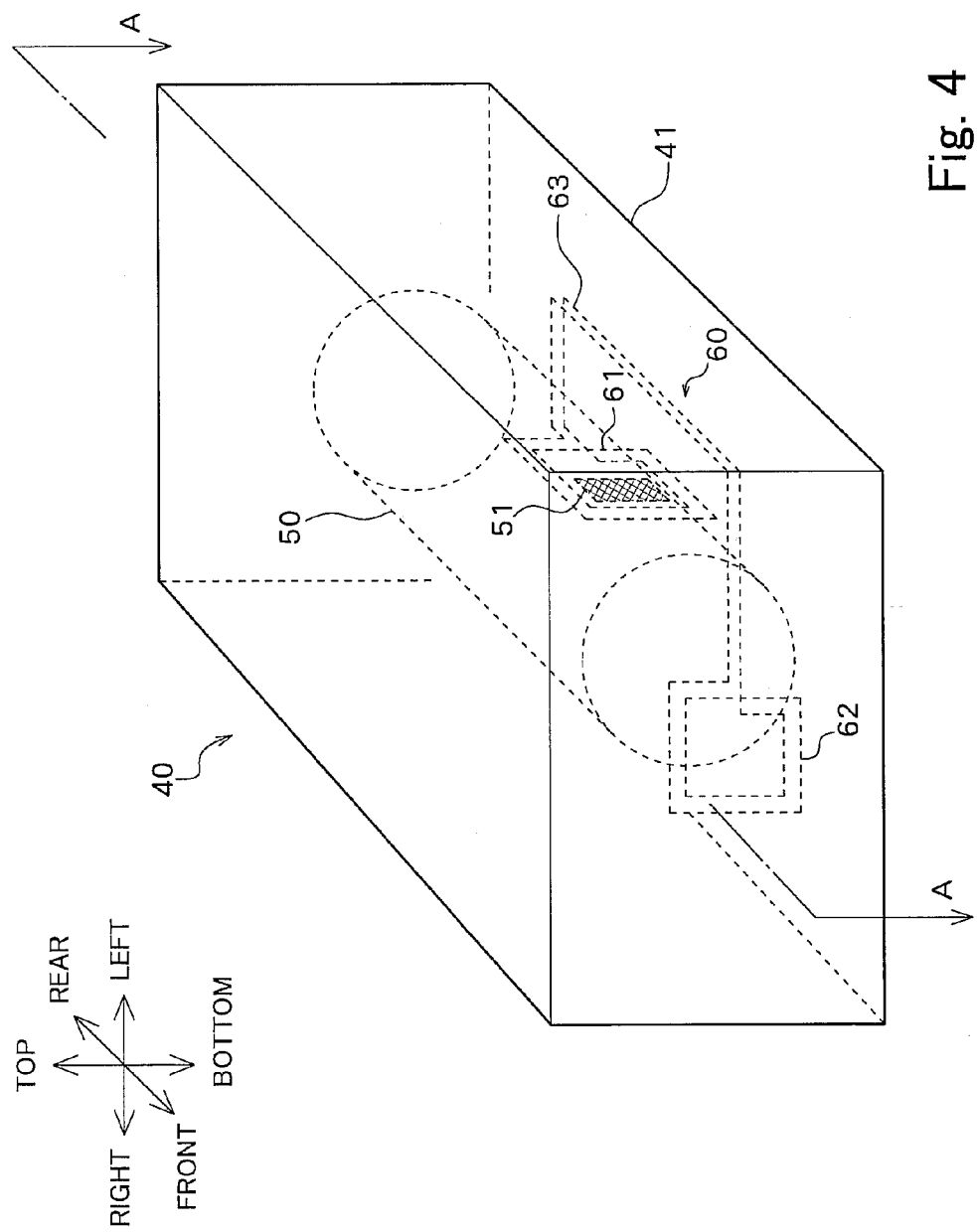
FIG. 4 is a simplified perspective view of a container relating to a second embodiment.
Figure 5:
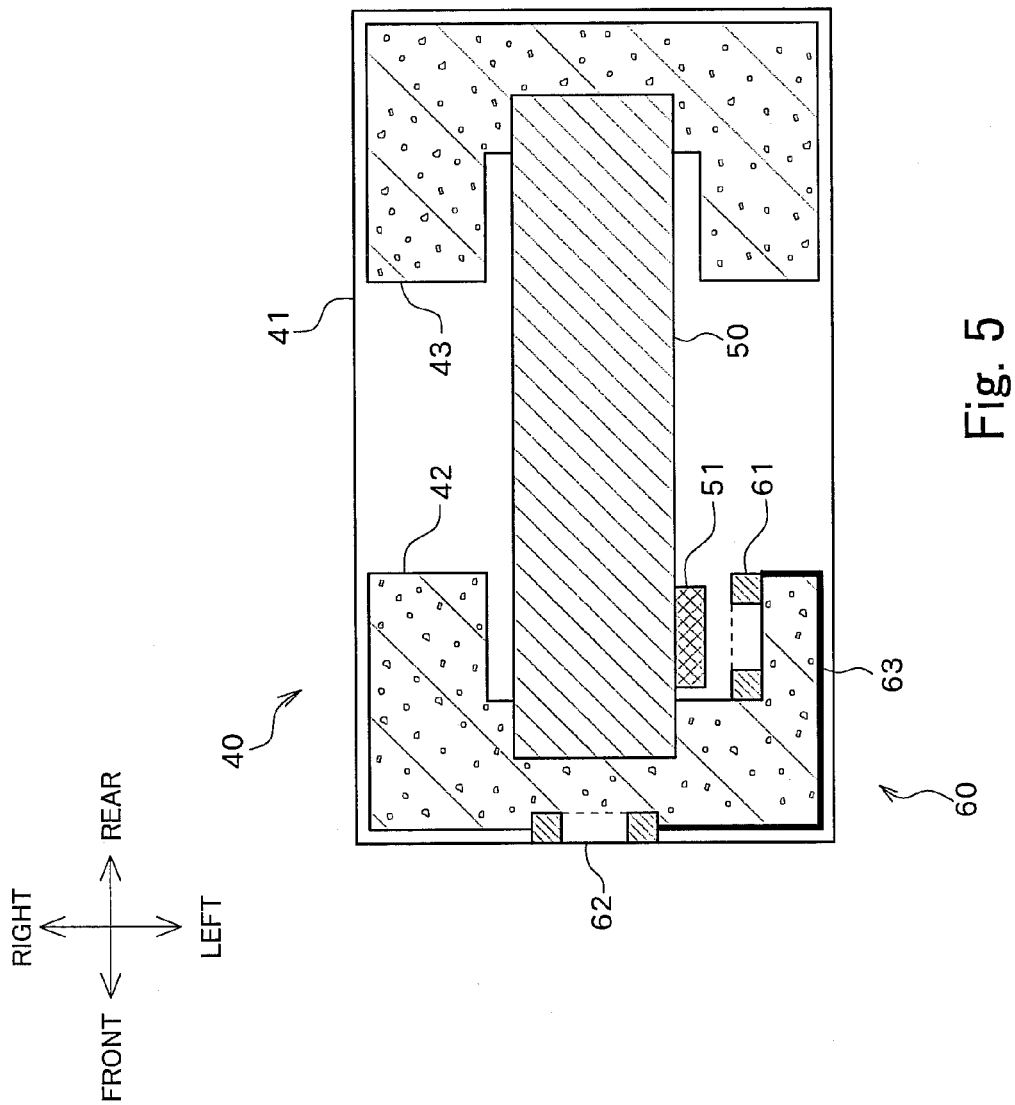
FIG. 5 is a schematic sectional view of A-A from FIG. 4.

FIG. 4 is a simplified perspective view of a container 40 relating to a second embodiment. FIG. 5 is a schematic sectional view of A-A from FIG. 4. The container 40 is for holding a product to which an RFID tag has been attached. The product to which an RFID tag has been attached is not limited to any product in particular. Here it is a replacement unit (drum cartridge, toner cartridge, or the like) for an image formation apparatus (copier, printer, or the like). For explanatory convenience in the description hereinafter, the directions of front, rear, top, bottom, left, and right are defined by the respective arrows shown in FIGS. 4 and 5.

A tag 51 has been attached to the left surface of a replacement unit 50. The tag 51 is utilized to control an image formation apparatus (not shown), and when the replacement unit 50 has been installed into the image formation apparatus (not shown), it faces a reader (not shown) in proximity so that the reading and writing of various types of control information are performed by the reader.

Generally, in the physical distribution process, the replacement unit 50 is held in a dedicated container so as to be supported by cushioning material, such as expanded polystyrene. Thus, in the physical distribution process, it is often not possible for the reader to face the tag 51 in proximity and the tag 51 cannot be accessed. On the other hand, there is a demand to utilize the tag 51 in the physical distribution process.

Accordingly, this embodiment provides the container 40 with a relay antenna to make it possible to access the tag 51 from outside the container. This container 40 will be described hereinafter.

In FIGS. 4 and 5, the container 40 has a container body 41 in the shape of a rectangular parallelepiped that is formed from six surfaces and cushioning materials 42, 43 (not shown in FIG. 4) that are formed, such as from expanded polystyrene. The replacement unit 50 is supported in front and behind within the container body 41 by the cushioning materials 42, 43.

In the container 40 is provided a relay antenna 60 for accessing the tag 51 from outside the container. The relay antenna 60 has a third antenna 61, a fourth antenna 62, and wires 63.

The third antenna 61 is a loop antenna for electromagnetic induction coupling with an antenna of the tag 51 and is installed in proximity to the tag 51. Here, in the packaged state, the third antenna 61 is provided at a location facing in proximity the tag 51 on the surface of the cushioning material 42.

The fourth antenna 62 is a loop antenna for electromagnetic induction coupling with a loop antenna outside the container and is installed in a component surface forming the container 40. More specifically, the fourth antenna 62 is provided on the front surface, rear surface, left surface, right surface, top surface, or bottom surface of the container 40. Here, the fourth antenna 62 is installed on the front surface of the container 40 so that to this surface the antenna surface is parallel. In this specification, the expression "an antenna is installed to a surface of the container" should be understood to include that the antenna is installed to or in proximity to the surface, such as the antenna is integrated into a panel on the inside or outside of a panel forming the surface, the antenna is installed inside a panel forming the surface, the antenna is installed apart from but in proximity to a panel forming the surface, and so forth. Here, however, the fourth antenna 62 is formed at a location facing the inner side of the front surface of the container body 41 on the surface of the cushioning material 42.

The wires 63, similar to the above-mentioned wires 33, connect the third antenna 61 and the fourth antenna 62 so as to form one closed loop.

In the container 40, the third antenna 61 couples with the antenna of the tag 51 through electromagnetic induction, the fourth antenna 62 couples with the antenna on the outside of the container through electromagnetic induction, and the wires 63 convey the induced currents generated at the third antenna 61 and the fourth antenna 62 to the fourth antenna 62 and the third antenna 61, respectively. Thus, according to this embodiment, the tag 51 can be accessed from outside the container. More specifically, even if the replacement unit 50 is packed into the container 40, the tag 51 inside the container can be accessed by facing the reader in proximity to the front surface of the container 40. As a result, it becomes possible to utilize the tag 51 even in physical distribution processes.

Furthermore, according to this embodiment, since the relay antenna 60 is attached to the cushioning material 42, the distance between the antenna of the tag 51 and the third antenna 61 can be precisely maintained so that reliable communication is possible.

If the position corresponding to the fourth antenna 62 is marked on the surface of the container 40, this clarifies the position where the reader is to face for added convenience.

Furthermore, if the fourth antenna 62 is installed on at least two of the six surfaces forming the container 40, access becomes possible from multiple directions. In particular, if the fourth antenna 62 is installed on all six surfaces, communication becomes possible from any surface.

Figure 6:
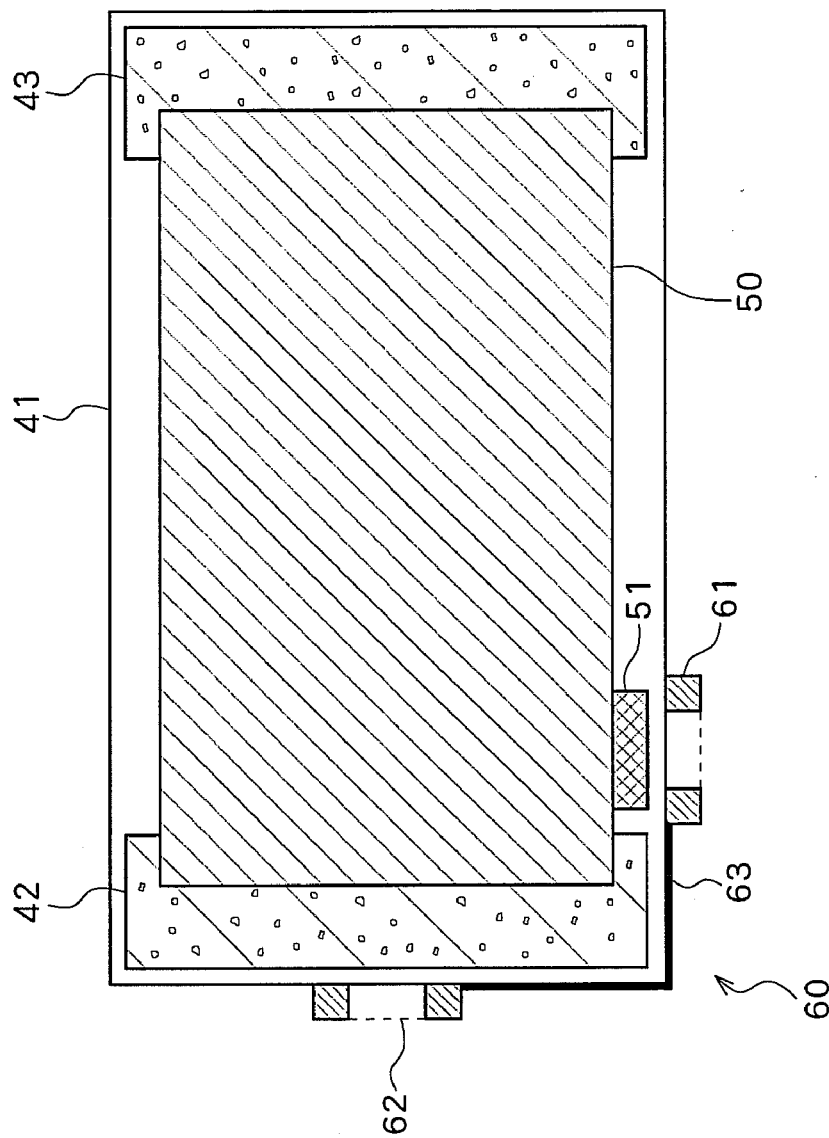
FIG. 6 is a schematic sectional view of the container provided with the relay antenna on the surface of the container body.

Furthermore, although the relay antenna 60 is provided in the cushioning material 42 in the above-mentioned embodiment, it may be formed in the container body 41 if, for example, the tag 51 is to be positioned in proximity to a component surface of the container 40. FIG. 6 is a schematic sectional view of the container provided with the relay antenna on the surface of the container body. In FIG. 6, the tag 51 is positioned in proximity to the left surface of the container 40 and the third antenna 61 is provided on the left surface of the container body 41. Furthermore, the fourth antenna 62 is provided on the front surface of the container body 41. Since the third antenna 61 is provided on the component surface of the container 40 with this configuration, it can be coupled with the antenna of the tag 51 through electromagnetic induction and can be also coupled with the antenna on the outside of the container through electromagnetic induction. Thus, in this configuration, the tag 51 can be accessed from two directions (front and left).

In the configuration where the relay antenna is provided on the surface of the container, if the relay antenna is a sticker type antenna, the relay antenna can be affixed to the container and the relay antenna installation process can be simplified. Furthermore, if the relay antenna is formed to integrate with a label sticker (such as a label sticker listing the name of the replacement unit) to be affixed to the container, the convenience can be further enhanced. A sticker type antenna may be, for example, a flexible sheet, such as paper, which has been printed with a conductive pattern and formed with an adhesive layer on the underside.

Third Embodiment

Figure 7:
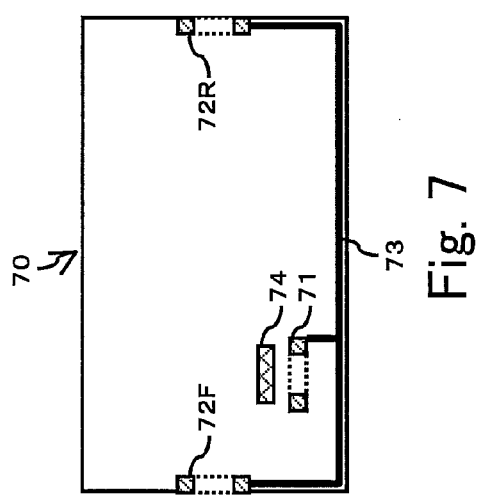
FIG. 7 is a schematic sectional view of the container relating to a third embodiment.

FIG. 7 is a schematic sectional view of a container 70 relating to this embodiment. The container 70 is substantially similar to the above-mentioned container 40. In the description hereinafter, the parts that are common with the second embodiment are omitted. Furthermore, in FIG. 7, the cushioning materials and the replacement unit are omitted.

In FIG. 7, a third antenna 71 is installed in proximity to a tag 74 for the replacement unit. Furthermore, on two mutually opposed surfaces (referred to hereinafter as "inline arranged surfaces" and here refers to the front surface and the rear surface) of the six surfaces, fourth antennas 72F, 72R are installed for respectively coupling to the antenna on the outside of the container through electromagnetic induction. The antennas 71, 72F, 72R are connected by wires 73. The fourth antennas 72F, 72R are installed in the following manner. Namely, when multiple containers 70 are arranged inline in proximity in a direction normal (referred to hereinafter as "arrangement direction" and here refers to the front and rear direction) to the inline arranged surfaces, the fourth antennas 72F, 72R that are installed on the inline arranged surface on both sides adjacent to each other are installed so as to face each other in proximity.

Figure 8:
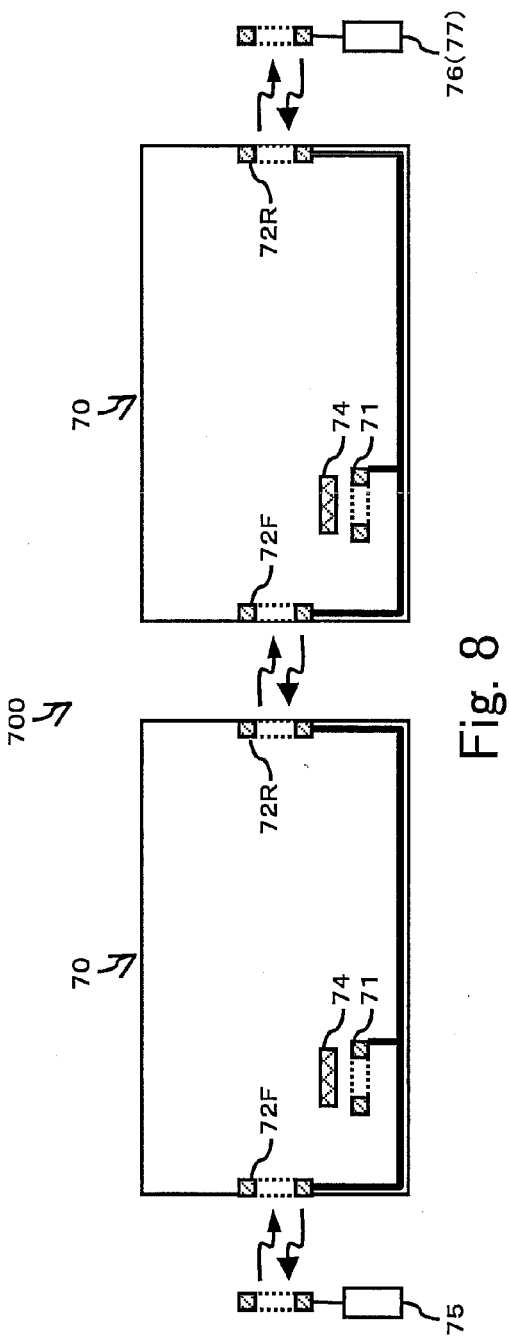
FIG. 8 is a schematic sectional view of a container sequence formed by a disposition method relating to the third embodiment.

FIG. 8 is a schematic sectional view of a container sequence 700 formed by a disposition method relating to this embodiment. In the disposition method relating to this embodiment as shown in FIG. 8, multiple containers 70 are arranged inline in the arrangement direction in proximity to form the container sequence 700. In the container sequence 700, the containers 70 that are mutually adjacent are electromagnetically connected through electromagnetic induction coupling between the fourth antennas 72F, 72R. The electromagnetic field that is input from one end surface (front or rear) of the container sequence 700 is conveyed to the other end surface by passing each of the containers 70, which are lined up in a row. Thus, the tag 74 inside each container 70 can be accessed from the end surface of the container sequence 700.

In a communication method relating to this embodiment as shown in FIG. 8, a reader 75 is arranged so as to face in proximity one end surface (front end surface in the figure) of the container sequence 700. Wireless communications are performed between the reader 75 and each tag 74 included in the container sequence 700. In this case, since communications are performed between the reader 75 and multiple tags 74, an anti-collision function is utilized for the RFID system. This anti-collision function is widely known and its description will be omitted herein.

In a communication confirmation method relating to this embodiment as shown in FIG. 8, a receiver 76 for communication confirmation is arranged to face in proximity the other end surface (rear end surface in the figure) of the container sequence 700. Then, on the basis of whether or not a signal from the reader 75 is received by the receiver 76, the arrival or non-arrival of the signal from the reader 75 to each tag 74 is judged. More specifically, when the signal from the reader 75 is received at the receiver 76, it is assumed that an electromagnetic connection has been established across both ends of the container sequence 700 so it is judged that the signal from the reader 75 has reached each tag 74 or will reach each tag 74. On the other hand, when the signal from the reader 75 is not received at the receiver 76, it is assumed that the electromagnetic connection is broken somewhere in the container sequence 700 so it is judged that the signal from the reader 75 may possibly not reach each tag 74.

In another communication confirmation method relating to this embodiment as shown in FIG. 8, a transponder 77 for communication confirmation is arranged so as to face in proximity the other end surface (rear end surface in the figure) of the container sequence 700. Then, on the basis of whether or not a response signal from the transponder 77 with respect to the signal from the reader 75 is received by the reader 75, the arrival or non-arrival of the signal from the reader 75 to each tag 74 is judged. More specifically, when there is a response from the transponder 77 to the reader 75, it is assumed that an electromagnetic connection has been established across both ends of the container sequence 700 so it is judged that the signal from the reader 75 has reached each tag 74 or will reach each tag 74. On the other hand, when there is no response from the transponder 77 to the reader 75, it is assumed that the electromagnetic connection is broken somewhere in the container sequence 700 so it is judged that the signal from the reader 75 may possibly not reach each tag 74.

The transponder 77 can also be utilized in the following manner in the above-mentioned configuration. Each tag 74 is assigned a serial number from "001" to "900" as an identifier. The transponder 77 is assigned a serial number "999" that is higher than the serial number of the tags 74. As a result of the anti-collision function, the reader 75 communicates with the transponder 77 and multiple tags 74 that are included in the container sequence 700 in ascending order of serial numbers. The reader 75 instructs the response function to stop with respect to tags 74 for which communication has completed. Then, the reader 75 judges that the communication with all tags 74 included in the container sequence 700 has completed when the response of the serial number to the interrogation remains at "999".

Figure 9:
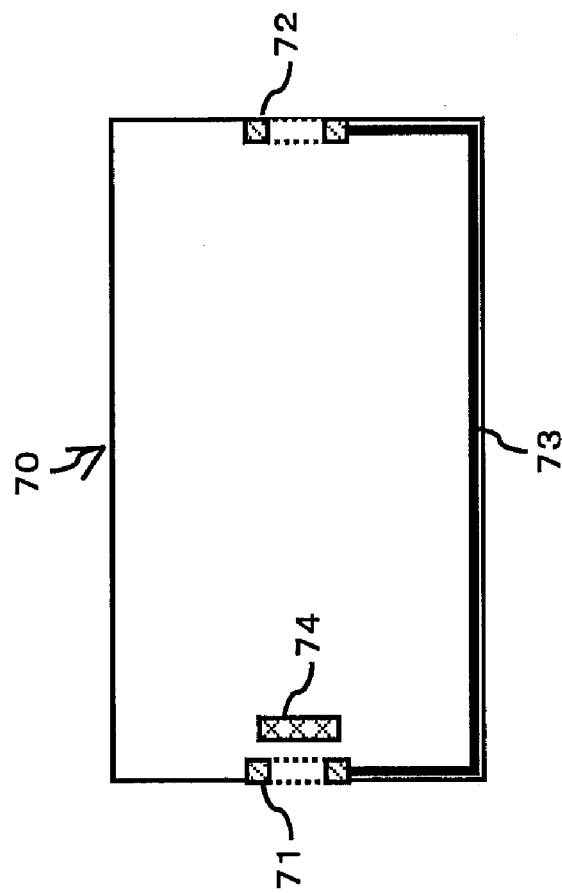
FIG. 9 is a schematic sectional view of the container provided with a third antenna and a fourth antenna on two inline arranged surfaces.

In the description above, the fourth antennas 72F, 72R are installed to the inline arranged surfaces of the container 70. However, as shown in FIG. 9, the third antenna 71 may be installed for electromagnetic induction coupling with the antenna on the outside of the container.

As described above, according to the container 70 relating to this embodiment, when the containers 70 are arranged inline, each tag 74 within each container 70 can be accessed from one end surface of the container sequence. More specifically, a container that is stacked to the rear of a pallet can be accessed from the front.

Furthermore, when multiple containers were stacked, such as on a pallet, there have been security problems in the past where it was difficult to determine if a container was missing. According to the container 70 relating to this embodiment, it is possible to detect the number of containers forming the container sequence by accessing each tag within each container from one end surface of the container sequence and it is possible to detect whether or not a container is missing by comparing the detected number with the number of containers that should be present. As a result, when multiple containers are installed inline, any missing container is immediately detected, and security can be enhanced.

Furthermore, according to the communication confirmation method relating to this embodiment, communication checks can be performed with a simple configuration since the arrival or non-arrival of signals is judged by arranging the receiver 76 or the transponder 77 on the opposite side of the reader 75. As a result, the possibility of a problem (including insufficient signal power) with the communication resources, such as relay antenna or reader, can be detected. Furthermore, the possibility of missing containers can be detected so that security can be strengthened.

Fourth Embodiment

Figure 10:
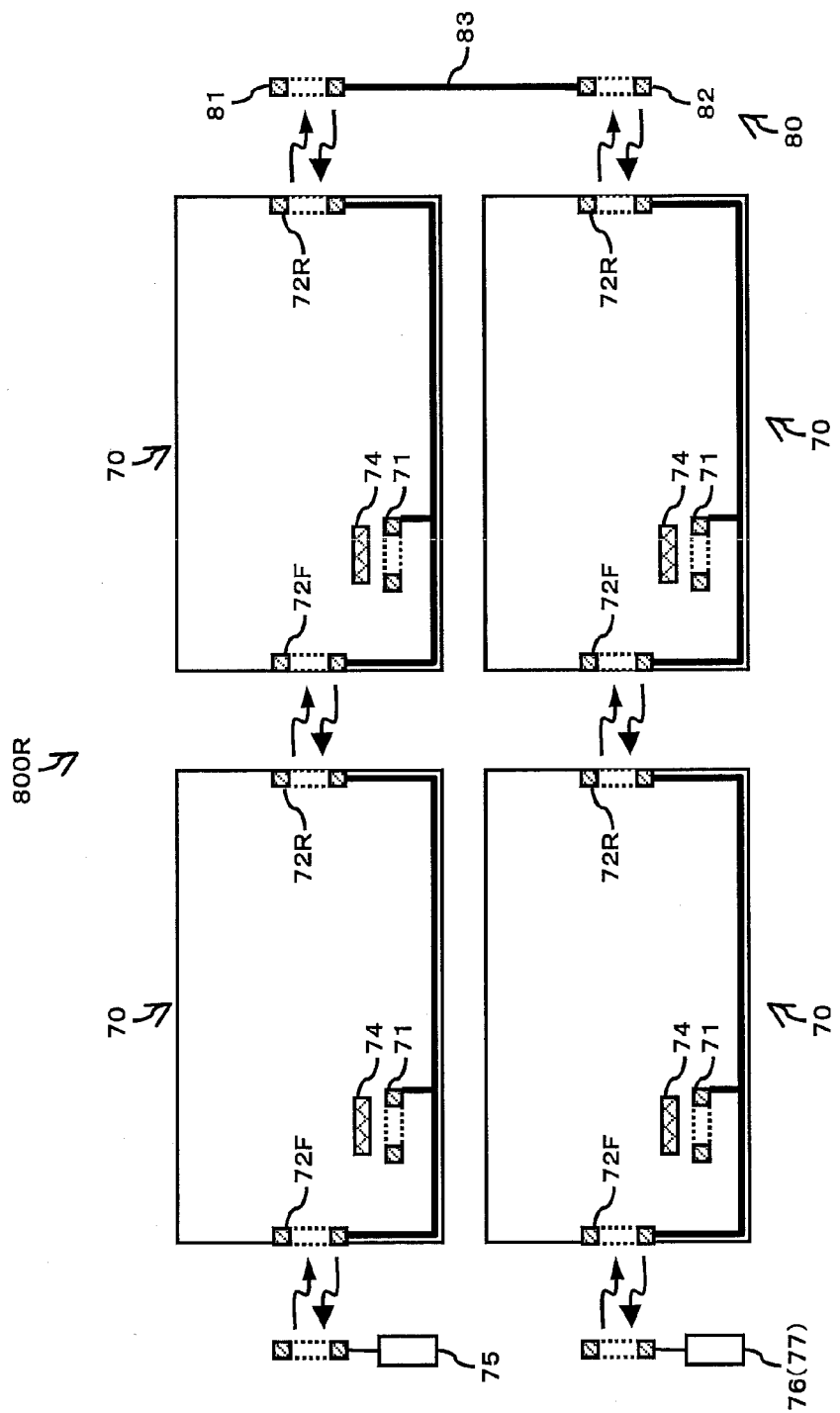
FIG. 10 is a schematic sectional view of a pair of container sequences formed by a disposition method relating to a fourth embodiment.

FIG. 10 is a schematic sectional view of a pair of container sequences 800R, 800L formed by a disposition method relating to a fourth embodiment.

In the container arrangement process in the disposition method relating to this embodiment, a pair of container sequences 800R, 800L, each with multiple containers 70 arranged inline in the arrangement direction, are arranged in parallel. Although they are arranged in parallel in a longitudinal direction, they may also be arranged in parallel in a vertical direction. Furthermore, both container sequences in the pair are preferably formed from the same number of containers and arranged with both end surfaces aligned.

In a U-turn antenna installation process, a U-turn antenna 80 is installed at a position facing one end surface (rear end surface in the figure) of the container sequences 800R, 800L. The U-turn antenna 80 is a relay antenna having a pair of loop antennas 81, 82, and wires 83. The pair of loop antennas 81, 82, each respectively arranged in a position facing in proximity the rear end surfaces of the pair of container sequences 800R, 800L, is coupled through electromagnetic induction with the fourth antenna 72R that has been installed at each rear end surface. The wires 83 connect the pair of loop antennas 81, 82 so as to form one closed loop, and convey induction currents between the pair of loop antennas 81, 82.

The implementation of the above-mentioned container arrangement process and the U-turn antenna installation process is not limited to any particularly order. For example, after the container sequences 800R, 800L are arranged in parallel, the U-turn antenna 80 may be installed on their rear end surfaces, or the container sequences 800R, 800L may be arranged in a collective container that has been mounted with the U-turn antenna.

In the above-mentioned configuration, the container sequences 800R, 800L are electromagnetically linked by the U-turn antenna 80. Then, after an electromagnetic field that is input from the other end surface (front end surface in the figure) of one of either container sequences 800R, 800L is conveyed to the rear end surface of one container sequence, it is input by the rear end surface of the other container sequence via the U-turn antenna. Then, the electromagnetic field that is input at the rear end surface of the other container sequence is conveyed to the front end surface of the other container sequence. Thus, it becomes possible to access the tag 74 included in the pair of container sequences from the front end surface of either one of the pair of container sequences 800R, 800L.

In a communication method relating to this embodiment as shown in FIG. 10, the reader 75 is arranged to face in proximity the other end surface (front end surface of the container sequence 800R in the figure) of one container sequence of the pair of container sequences 800R, 800L formed from the above-mentioned disposition method. Then, wireless communications are performed between the reader 75 and each tag 74 included in the container sequences 800R, 800L.

In a communication confirmation method relating to this embodiment as shown in FIG. 10, the receiver 76 for communication confirmation is arranged to face in proximity the other end surface (front end surface of container sequence 800L in the figure) of the other container sequence of the pair of container sequences 800R, 800L. Then, similar to the third embodiment, on the basis of whether or not the signal from the reader 75 is received by the receiver 76, the arrival or non-arrival of the signal from the reader 75 to each tag 74 is judged.

In another communication confirmation method relating to this embodiment as shown in FIG. 10, the transponder 77 for communication confirmation is arranged to face in proximity the other end surface (front end surface of the container sequence 800L in the figure) of the other container sequence of the pair of container sequences 800R, 800L. Then, similar to the third embodiment, on the basis of whether or not the response signal from the transponder 77 with respect to the signal from the reader 75 is received by the reader 75, the arrival or non-arrival of the signal from the reader 75 to each tag 74 is judged.

As described above, according to this embodiment, multiple tags included in the two container sequences can be accessed simultaneously. Furthermore, the receiver 76 or the transponder 77 for communication confirmation can be arranged at the same side as the reader 75 so that a simpler communication check can be performed.

Furthermore, since multiple tags included in the two rows of container sequences can be accessed simultaneously, the number of containers forming the two rows of container sequences can be detected, and whether or not a container is missing from the two rows of container sequences can be detected by comparing the detected number with the number of containers that should be present. Furthermore, since a simpler communication check can be performed, the possibility of a problem with the communication resources and the possibility of missing containers can be easily detected.

Fifth Embodiment

Figure 11:
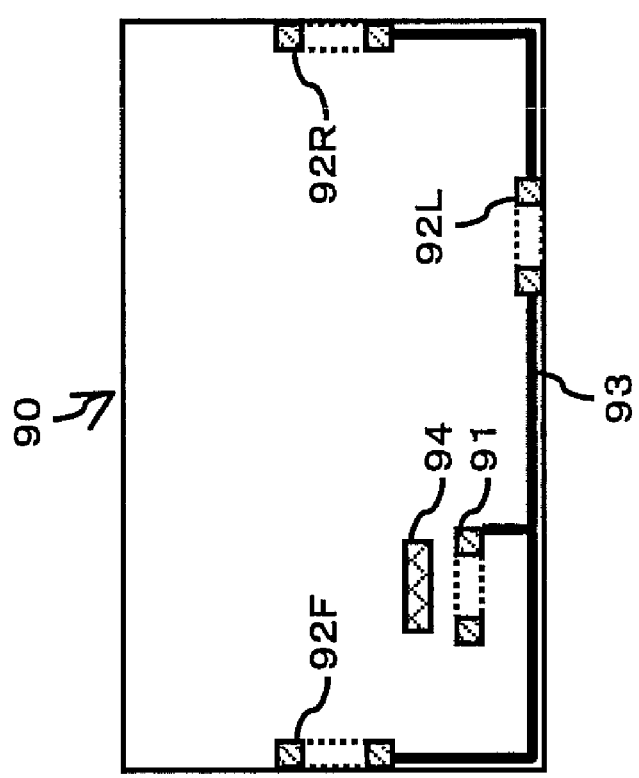
FIG. 11 is a schematic sectional view of a container relating to a fifth embodiment.

FIG. 11 is a schematic sectional view of a container 90 relating to this embodiment. The container 90 is substantially the same as the above-mentioned container 40. The cushioning materials and replacement unit are omitted in the figure.

In FIG. 11, a third antenna 91 is installed near a tag 94 of a replacement unit. Furthermore, fourth antennas 92F, 92L, 92R for electromagnetic induction coupling with respective antennas outside the container are installed on two adjacent surfaces of the six surfaces (referred to hereinafter as "loop arranged surfaces" and here refer to the front surface and the left surface) and one other surface (referred to hereinafter as "access surface"). These antennas 91, 92F, 92L, 92R are connected by wires 93. Here, the fourth antennas 92F and 92L are installed in the following manner. Namely, when four containers 90 are arranged in a square loop configuration so that the loop arranged surfaces are mutually adjacent between containers, the fourth antennas 92F, 92L, which are installed on the loop arranged surfaces of both sides adjacent to each other, face each other in proximity.

Figure 12:
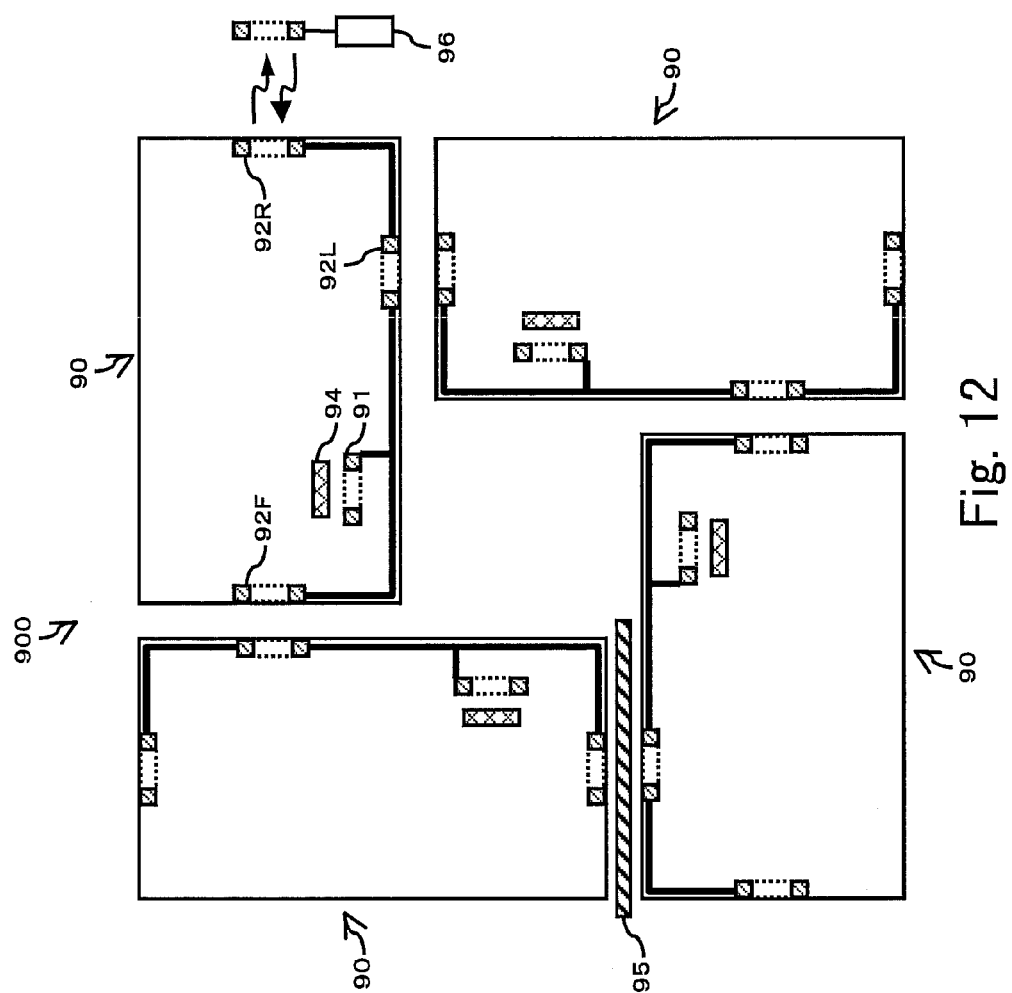
FIG. 12 is a schematic sectional view of a container group formed by a disposition method relating to the fifth embodiment.

FIG. 12 is a schematic sectional view of a container group 900 formed by a disposition method relating to this embodiment.

In the container arrangement process in the disposition method relating to this embodiment as shown in FIG. 12, four containers 90 are arranged in a square loop configuration to form the container group 900 so that the loop arranged surfaces are mutually adjacent between containers.

In a shield member installation process, a shield member 95 to prevent interference in the electromagnetic induction coupling between the fourth antennas 92F, 92L is installed at one location among the four locations where the loop arranged surfaces are mutually adjacent in the container group 900. The implementation of the above-mentioned container arrangement process and the shield member installation process is not limited to any particular order.

In the above-mentioned configuration, the four containers 90 are electromagnetically connected through electromagnetic induction coupling between the fourth antennas 92F, 92L at three adjacent locations. Then, the electromagnetic wave that is input from one of the access surfaces is conveyed to all the four containers 90. Thus, it becomes possible to access the four tags 94 included in the container group 900 from any access surface. In the above-mentioned configuration, if the shield member 95 is not installed, an electromagnetic closed loop is formed causing interference and resulting in unstable communications.

In the communication method relating to this embodiment as shown in FIG. 12, a reader 96 is arranged to face in proximity any access surface of the container group 900. Then, wireless communications are performed between the reader 96 and each tag 94 included in the container group 900.

In the above description, the fourth antennas 92F, 92L, 92R are installed on two loop arranged surfaces and one access surface of the container 90. However, as in the third embodiment, the third antenna 91 for electromagnetic induction coupling with the antenna on the outside of the container may be installed.

As described above, according to this embodiment, when the containers 90 are arranged in the layout shown in FIG. 12, each tag 94 within each container 90 can be accessed from any access surface. More specifically, the four containers stacked on the pallet as shown in FIG. 12 can be accessed simultaneously from one direction.

Furthermore, it is possible to detect the number of containers forming the container group by accessing each tag within each container from any access surface, and it is possible to detect whether or not a container is missing by comparing the detected number with the number of containers that should be present (4 containers) . As a result, when the containers are arranged as shown in FIG. 12, any missing container is immediately detected, and security can be strengthened.

Sixth Embodiment

Figure 13:
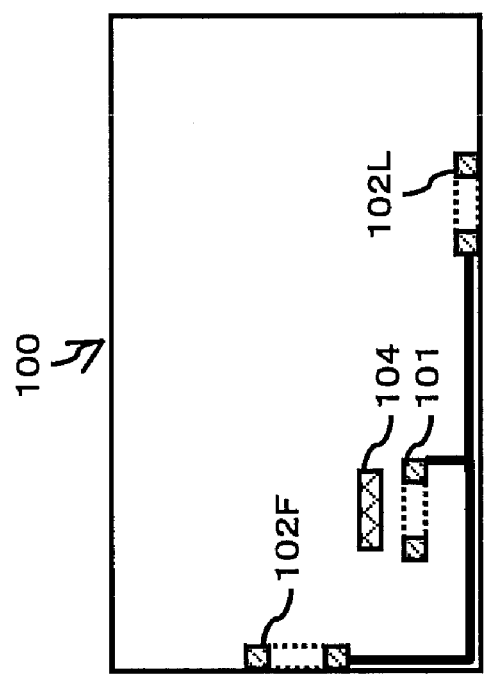
FIG. 13 is a schematic sectional view of a container relating to a sixth embodiment.

FIG. 13 is a schematic sectional view of a container 100 relating to this embodiment. The container 100 is substantially the same as the above-mentioned container 90.

In the container 100, similar to the above-mentioned container 90, a third antenna 101 is installed near a tag 104 and fourth antennas 102F, 102L are respectively installed on the loop arranged surfaces of the front surface and the left surface. Here, the fourth antennas 102F, 102L are installed in the following manner. Namely, when the four containers 100 are arranged in a square loop shape so that the loop arranged surfaces between the containers are mutually adjacent at three locations and not adjacent at one location, the fourth antennas 102F, 102L installed at the loop arranged surfaces on both sides adjacent to each other, face each other in proximity. In this embodiment, the installation of the loop antenna with respect to the other surface (access surface) may be omitted.

Figure 14:
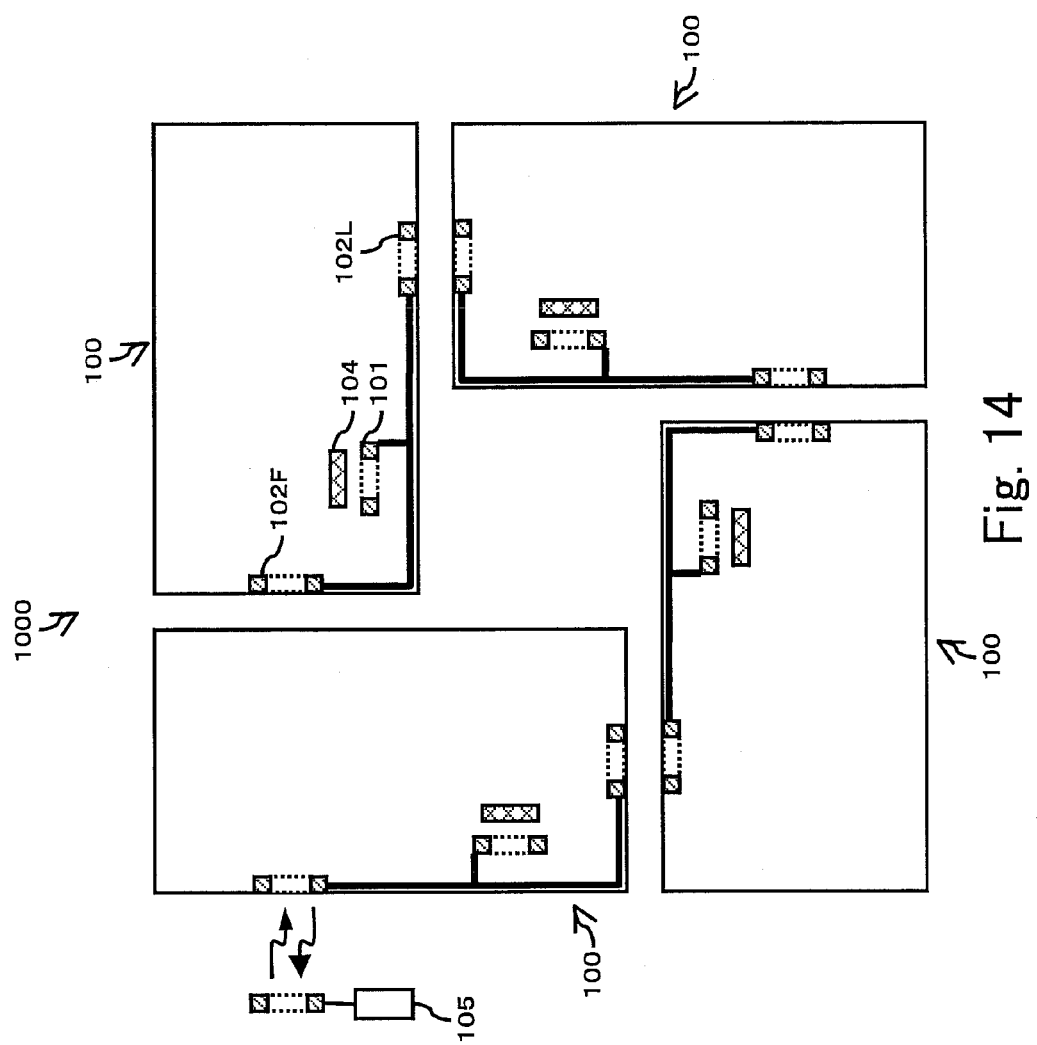
FIG. 14 is a schematic sectional view of a container group formed by a disposition method relating to the sixth embodiment.

FIG. 14 is a schematic sectional view of a container group 1000 formed by a disposition method relating to this embodiment. In the disposition method relating to this embodiment as shown in FIG. 14, four containers 100 are arranged in a square loop shape so that the loop arranged surfaces between the containers are mutually adjacent at three locations and not adjacent at one location to form the container group 1000. For example, when the fourth antenna 102F has been arranged at the center of the front surface, if one of the four containers in FIG. 12 is rotated 180 degrees with the longitudinal direction as the axis of rotation, the result is shown in FIG. 14.

In the above-mentioned configuration, the four containers 100 are connected electromagnetically through electromagnetic induction coupling between the fourth antennas 102F, 102L at the three adjacent locations. Then, the electromagnetic field that is input from the exposed fourth antenna 102L is conveyed to all four containers 100. Thus, it becomes possible to access the tag 104 included in the container group 1000 from the loop arranged surface that is exposed to the outside.

In the communication method relating to this embodiment as shown in FIG. 14, a reader 105 is arranged to face in proximity the loop arranged surface that is exposed to the outside of the container group 1000 formed by the above-mentioned disposition method. Then, wireless communications are performed between the reader 105 and each tag 104 included in the container group 1000.

As described above, according to this embodiment, when the containers 100 are arranged in the layout shown in FIG. 14, each tag 104 within each container 100 can be accessed from the outside. Furthermore, since shield members and loop antennas at the access surfaces are unnecessary, it is possible to design a simplified configuration. Furthermore, the configuration is simpler than in the fifth embodiment so that as in the above-mentioned fifth embodiment, any missing container can be detected and security can be strengthened.

Seventh Embodiment

Figure 15:
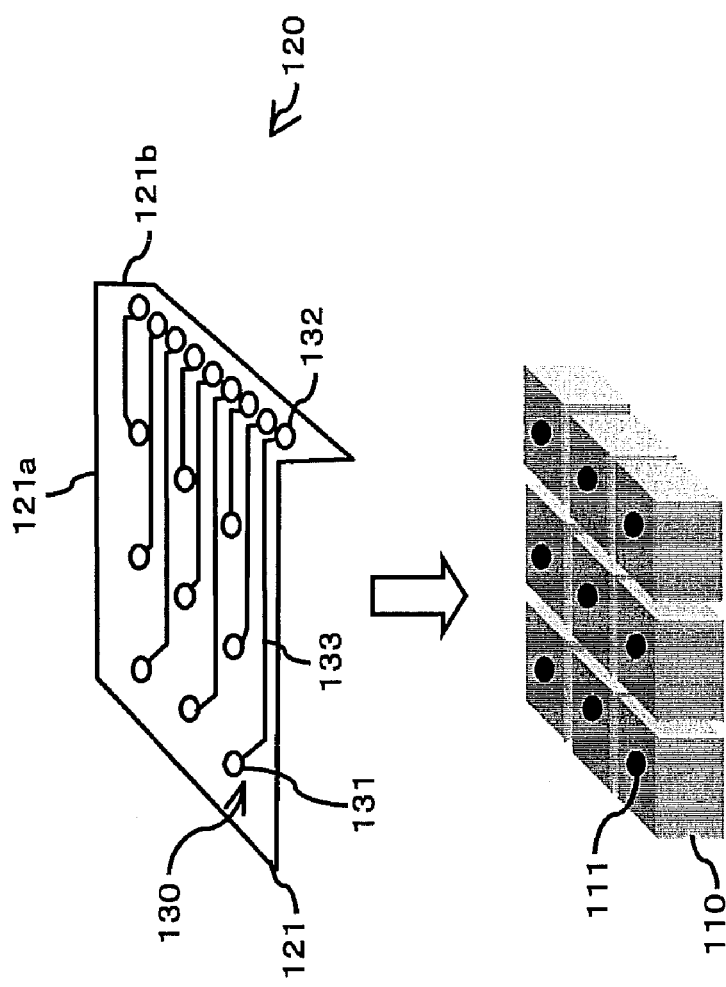
FIG. 15 is a schematic diagram illustrating a disposition method relating to a seventh embodiment.

FIG. 15 is a schematic diagram illustrating a disposition method relating to this embodiment. In FIG. 15, a container 110 has the shape of a rectangular parallelepiped and contains a product to which a tag has been attached. A loop antenna 111 at the tag is installed on a component surface (here the top surface) forming the container 110. Here, the loop antenna 111 at the tag may be a loop antenna at the tag itself or a loop antenna of the relay antenna that is electromagnetically connected with the loop antenna at the tag itself.

In the container arrangement process relating to this embodiment, M×N containers 110 are arranged in a matrix configuration of M rows and N columns along a plane parallel to the component surface (referred to hereinafter as antenna installed surface) on which is installed the loop antenna 111. Here, M and N are positive integers, preferably an integer of 2 or higher, and more preferably 3 or higher. In FIG. 15, M=N=3.

In the relay antenna sheet installation process, a relay antenna sheet 120 is installed at a location facing the antenna installed surface of M×N containers 110 arranged in a matrix configuration. The relay antenna sheet 120 has a flexible or non-flexible sheet member 121 as a substrate provided with M×N relay antennas 130. The sheet member 121 includes a first region 121a overlapping the antenna installed surface of M×N containers 110 and a second region 121b provided outside the first region 121a.

M×N first antennas 131 are arranged on the first region 121a in a matrix configuration of M rows and N columns. The first antennas 131 of the M rows and N columns are provided in correspondence to the containers 110 of the M-rows and N-columns and are loop antennas for electromagnetic induction coupling with the loop antennas 111 of the corresponding containers 110.

M×N second antennas 132 are arranged to pair with the corresponding first antennas 131 on the second region 121b. The second antennas 132 are loop antennas for electromagnetic induction coupling with the loop antenna at the reader. In FIG. 15, the second antennas 132 are lined up in one row along the longitudinal direction on the left side of the container group.

Similar to the first embodiment, for each pair of first antennas 131 and second antennas 132, wires 133 connect the first antenna 131 and the second antenna 132.

In the communication method relating to this embodiment, a reader (not shown) faces in proximity the desired second antenna 132 of the relay antenna sheet 120. Then, wireless communications are performed via the relay antenna 130 between the reader and the tag corresponding to the above-mentioned second antenna 132.

As described above, according to this embodiment, with the containers arranged in a matrix configuration, each tag included in each container can be accessed from the outside. Furthermore, since all the second antennas 132 are installed on one side of the container group, all the tags can be accessed from one side for enhanced convenience.

Furthermore, according to this embodiment, it is possible to detect the number of arranged containers by accessing each tag within each container that is arranged in a matrix configuration and it is possible to detect whether or not a container is missing by comparing the detected number with the number of containers that should be present (M×N containers). As a result, when the containers are arranged in the matrix configuration, any missing container is immediately detected, and security can be strengthened.

Eighth Embodiment

Figure 16:
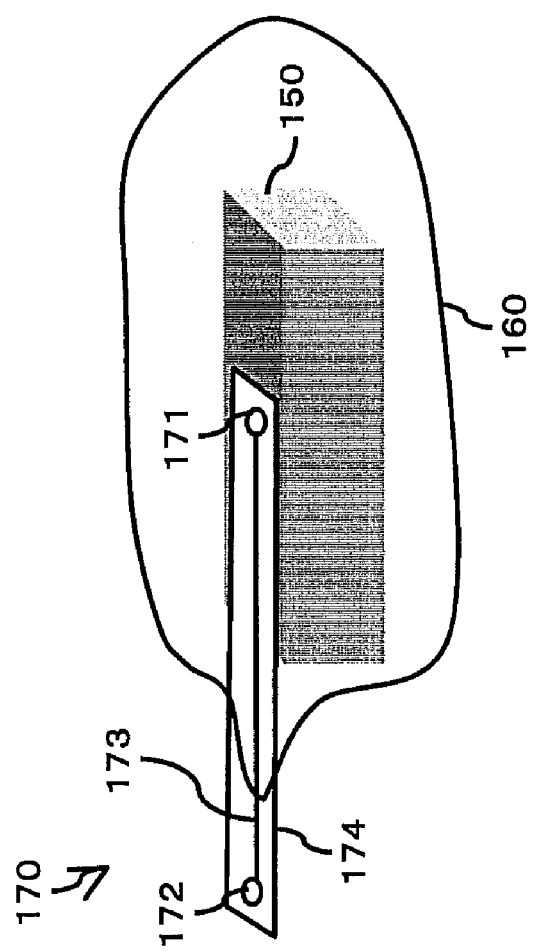
FIG. 16 is a schematic diagram showing a package construction relating to an eighth embodiment.

FIG. 16 is a schematic diagram showing a package construction relating to this embodiment. This package construction packages a replacement unit 150 to which a tag (not shown) has been attached.

In FIG. 16, the replacement unit 150 is packaged with a packaging bag 160. The packaging bag 160 is a gas barrier bag that includes aluminum foil for a barrier layer. Here, since the aluminum foil is an electromagnetic shield layer, when the replacement unit 150 is simply packaged with the packaging bag 160, the tag within the packaging bag 160 cannot be accessed from the outside.

Accordingly, a relay antenna 170, which is similar to that in the first embodiment, is provided in this embodiment to enable access to the tag within the packaging bag from the outside of the packaging bag.

The relay antenna 170 is formed from a first antenna 171, a second antenna 172, and wires 173 on a sheet 174 having an elongated rectangular shape. Here, the first antenna 171 is installed at a location facing in proximity the tag within the packaging bag 160. On the other hand, the second antenna 172 is installed on the outside of the packaging bag 160.

In this embodiment, communication with the tag within the packaging bag 160 is possible by placing a reader to face in proximity the second antenna 172. Namely, according to this embodiment, in the package construction where a product is packaged in a packaging bag that includes an electromagnetic shield layer, the relay antenna is used as a marker so that it becomes possible to access from the outside the tag that is attached to the product within the packaging bag.

Ninth Embodiment

This embodiment relates to the tag attachment configuration to a unit package container and to the palletized configuration, and more specifically, to the attachment position of the tag to the unit package container and the stacking state of unit package containers on the pallet.

Figure 17:
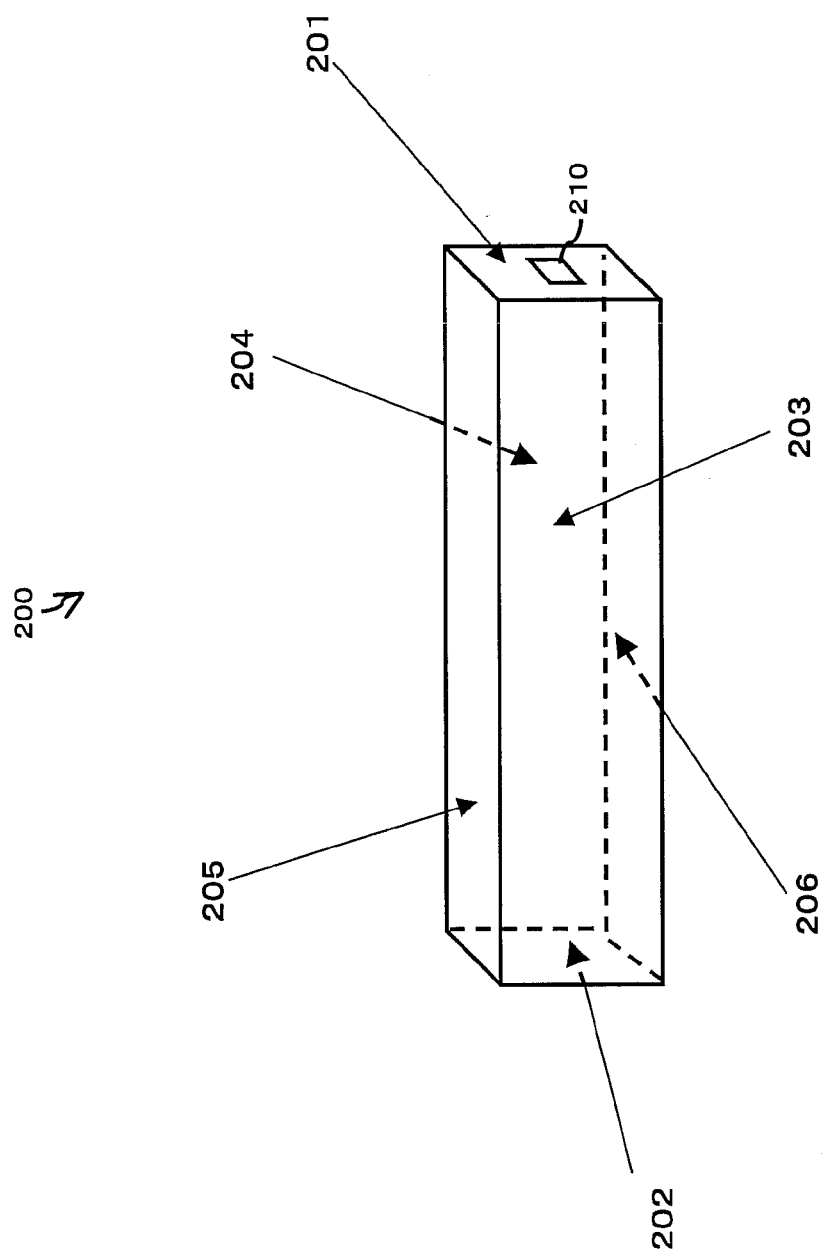
FIG. 17 is a simplified perspective view showing a unit package container relating to a ninth embodiment.

FIG. 17 is a simplified perspective view showing a unit package container 200 relating to this embodiment. The unit package container 200 is, for example, a package for a copier or printer process cartridge. As shown in FIG. 17, the unit package container 200 is a rectangular parallelepiped that is formed from a primary end surface 201, a secondary end surface 202, a front surface 203, a rear surface 204, a top surface 205, and a bottom surface 206. A tag 210 that has been recorded with information, such as product code of the content, date of manufacture, model codes of compatible copiers or printers, and so forth, is attached on top or underneath the primary end surface 201 on the unit package container 200. Although the tag 210 is not limited to any particular shape, it has a sheet shape here.

Figure 18:
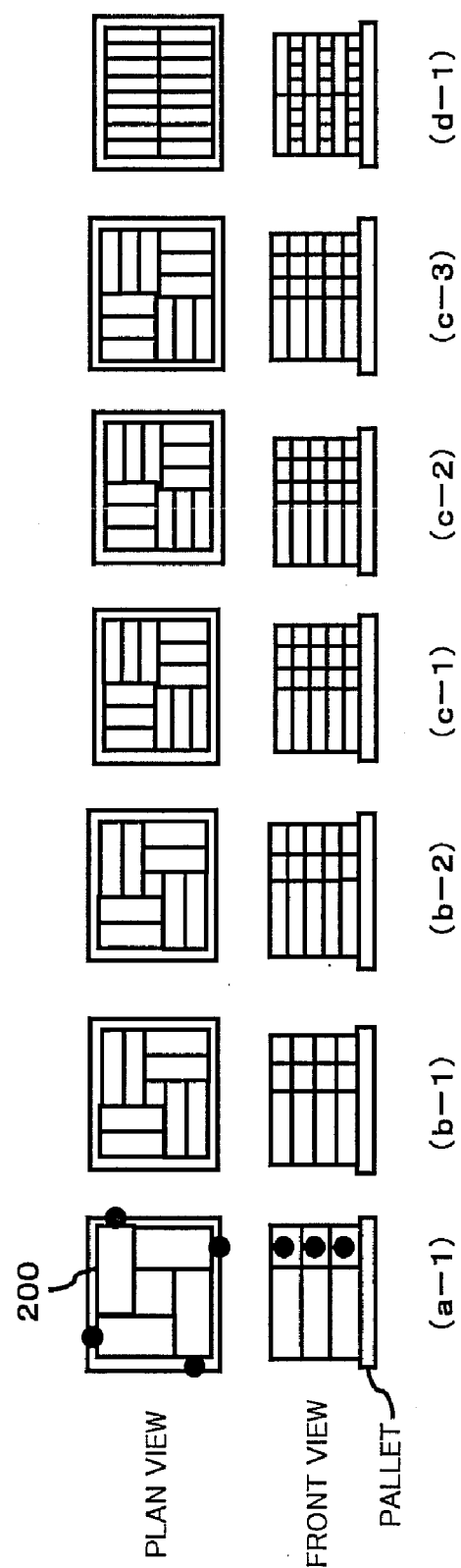
FIG. 18 show simplified plan views and simplified front views illustrating examples of palletized unit package containers.

FIG. 18 show simplified plan views and simplified front views illustrating examples (seven examples) of palletized unit package containers 200. In the description below, a load (unit package container group) in which multiple unit package containers 200 are palletized is referred to as "palletized load" for convenience. As shown in FIG. 18, the unit package containers 200 in this embodiment are palletized so that the primary end surface 201 is exposed to the outside (positioned on the surface of the palletized load). The black dots of "a-1" in FIG. 18 denote the positions of the primary end surfaces 201 (or tags 210).

It is generally desirable to set the dimensions of the palletized state (palletized dimensions) on the basis on the size of the marine cargo container or truck cargo bay while taking into account the transport efficiency.

Figure 19:
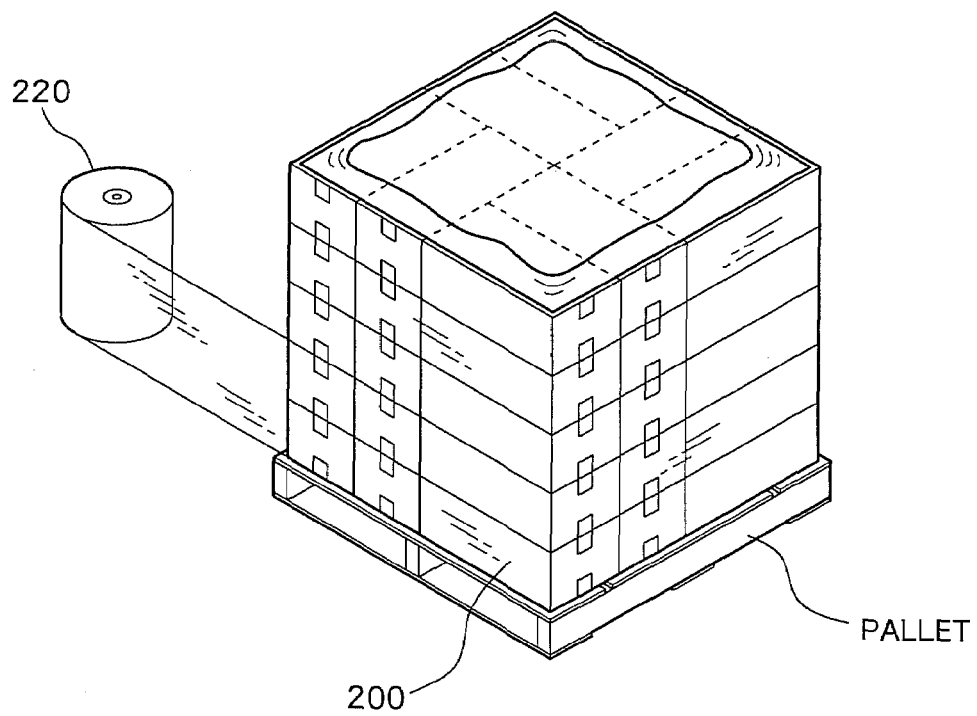
FIG. 19 is a perspective view showing a state where stretch film is wrapped around palletized unit package containers.

Furthermore, in general, the stacked unit package containers 200 are wrapped with a film 220, called stretch film, as shown in FIG. 19, to prevent collapse or soiling or damage to the unit package containers during transport. This results in inconvenience as the film 220 must be removed when de-palletizing the containers.

In the above-mentioned configuration, all tags 210 face the palletized surface. Thus, the tags 210 can be accessed without having to disassemble the pallet. The information that is read or recorded by this access includes, for example, distribution management information, such as distribution center transit information from factory shipment to arrival at the customer and a record of the final destination.

After the pallet has been disassembled for storage at a warehouse, store, or customer shelf, the primary end surface 201 is positioned to the front and is printed with extremely important information, such as product name, product code, compatible models, and so forth. Thus, from the viewpoint of maintaining visibility, the primary end surface 201 is demanded to be simple. Accordingly, it is appropriate for the tag 210 to be installed underneath the primary end surface 201. Here, the thickness of the cardboard for the unit package container 200 is ordinarily 5 mm or less so as not to interfere with the radio wave or electromagnetic wave for accessing the tag 210.

Figure 20:
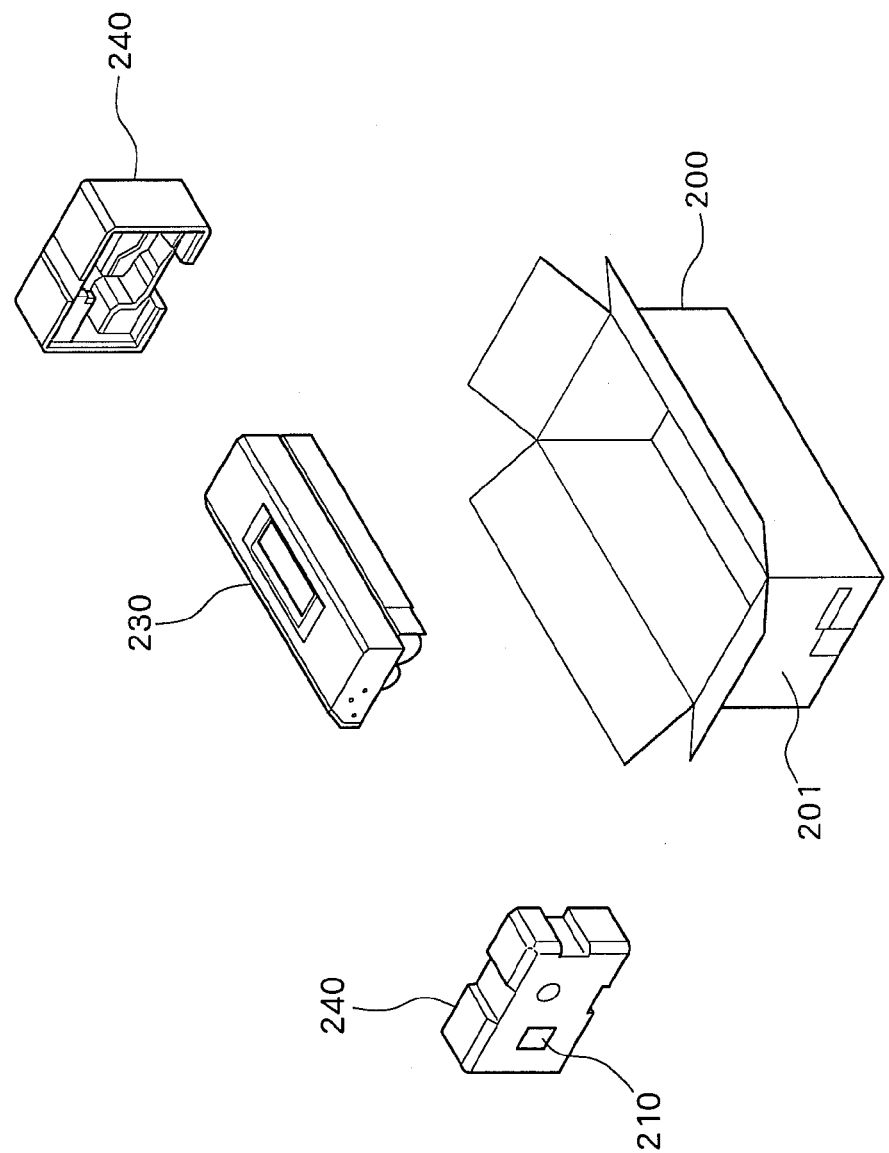
FIG. 20 is a perspective view showing the unit package container and its contents.

FIG. 20 is a perspective view showing the unit package container 200 and its contents. In FIG. 20, a product 230, which is a process cartridge, toner cartridge, or the like, is housed in the unit package container 200 so as to be covered by a cushioning material 240, such as expanded polystyrene (EPS), for protection against vibration and drop impact during distribution.

In a preferred embodiment, the tag 210 is installed on the side of the cushioning material 240 facing the primary end surface 201. According to this configuration, compared with attaching to the primary end surface 201, the risk of damage to the tag 210 during the distribution process is reduced. Furthermore, compared with attaching to the rear side of the primary end surface, the attachment workability is highly superior.

Figure 21:
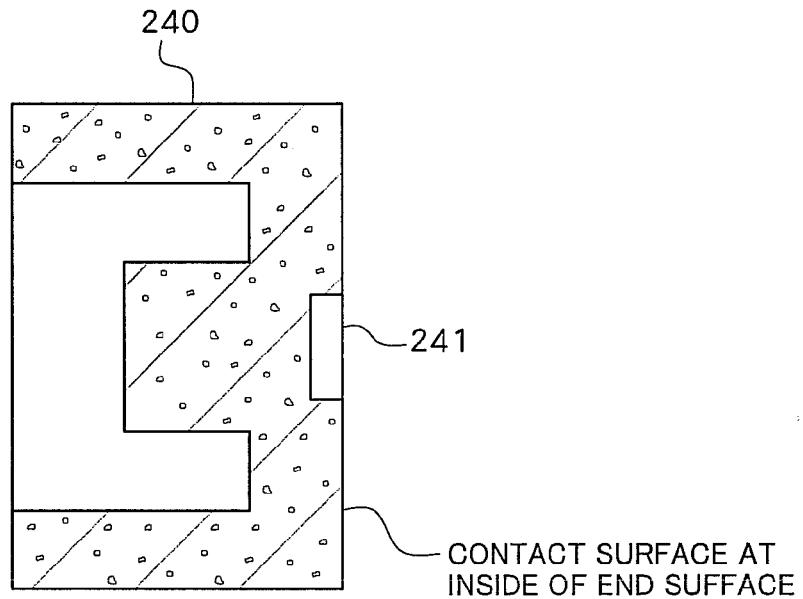
FIG. 21 is a schematic sectional view showing an example of cushioning material provided with an opening for tag attachment.
Figure 22:
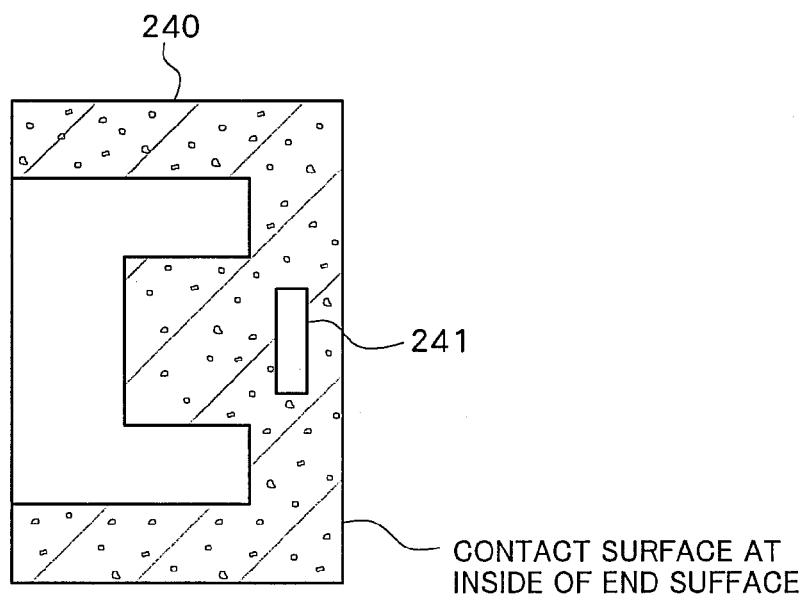
FIG. 22 is a schematic sectional view showing another example of cushioning material provided with an opening for tag attachment.

In a further preferred embodiment as shown in FIGS. 21 and 22, an opening 241 is provided in the cushioning material 240 and the tag 210 is held in this opening 241. According to this configuration, the tag 210 is easily reused.

Although the unit package container 200 was the palletized unit load in the description above, a collective container housing multiple unit package containers 200 may be the palletized unit load. In this case, by providing a tag on the primary end surface of the collective container and using the stacking pattern shown in FIG. 18, the tag can be accessed from outside the pallet load similar to the case for the unit package container. Here, the tag that is provided on the collective container is recorded with information, such as that relating to each unit package container.

(1) In this embodiment, with a tag attached on one end surface of a unit package container containing a product or a collective container containing multiple unit package containers and the unit package containers or collective containers stacked on a pallet, all surfaces on which are attached a tag on the unit package containers or collective containers are positioned toward the outside of the pallet. Thus, in the palletized state, since the tags attached on all the unit package containers are positioned on the peripheral surface of the pallet load, the tags on all the unit package containers or collective containers can be arranged in proximity to the reader so that the tags can be easily accessed.

(2) In a preferred embodiment, the tag is attached on the inside of the end surface of the unit package container or collective container. According to this embodiment, physical damage to the tag can be prevented in the distribution process. Furthermore, during the individual storage on a shelf, the end surface is arranged to face the outside of the shelf so that important information, such as product model number, is visible. Therefore, notwithstanding the tag is not present on the outside of the end surface, printed information on the outside of the end surface can be arranged to be highly visible.

(3) In a preferred embodiment, the tag is attached on a surface facing the end surface of the cushioning material to protect the product within the unit package container. According to this embodiment, in comparison to the above-mentioned (2), the workability of tag attachment is superior and the attachment position precision can be easily improved.

(4) In a preferred embodiment, the tag is attached in an opening provided in part of the cushioning material so as to be removable. According to this embodiment, in comparison to the above-mentioned (3), the physical impact on the tag is small so tag failure can be reduced and the attachment dimension precision can be improved. Furthermore, since the use of adhesives is unnecessary, the tag can be easily reused.

(5) In a preferred embodiment, the printing on the primary end surface and that on the secondary end surface have different contents and colors. According to this embodiment, the primary end surface and the secondary end surface can be clearly distinguished so as to prevent the tag attachment surface from being mistaken during tag attachment or access.

(6) In a preferred embodiment, the tag that is attached on the outside of the primary end surface also serves as a label that has the necessary printing on the primary end surface. According to this embodiment, the primary end surface attached label and IC tag sheet can be commonized for cost reductions.

Tenth Embodiment

This embodiment relates to a handling management system for products using tags, and more specifically to an invention where a tag is recorded with handling precautions (handling marks) for a product, a warning is issued on the basis of the necessary handling information when a cargo handler moves or sorts the product, and mishandling and the accompanying damage to the carried product can be prevented.

Package cushioning materials have been designed so that products can withstand drop impacts that may occur in the distribution process before delivery to the customer. Furthermore, the surface of the unit package container containing the product is indicated with a handling mark that signifies the product should be handled with care.

However, products are sometimes damaged by rough handling, such as when a cargo handler tosses unit package containers outside from the truck cargo bay.

Furthermore, with regard to the spent process cartridges and toner cartridges, such as for copiers and printers, reverse logistics systems for their collection have been established due to environmental concerns. However, due to various causes, such as improper packing by the customer or inappropriate handling by cargo handlers, there are instances where trouble may occur, such as when the residual toner in the spent process cartridges or toner cartridges leaks out from the unit package container.

Accordingly, this embodiment provides a system for alleviating this sort of trouble or a system that makes it possible to trace the distribution route in the event trouble occurs so as to facilitate improvements in cargo handling.

It should be noted that this embodiment is applicable not only to copier and printer supplies but also to many products that require care in handling, such as glass products, precision equipment, and so forth.

Figure 23:
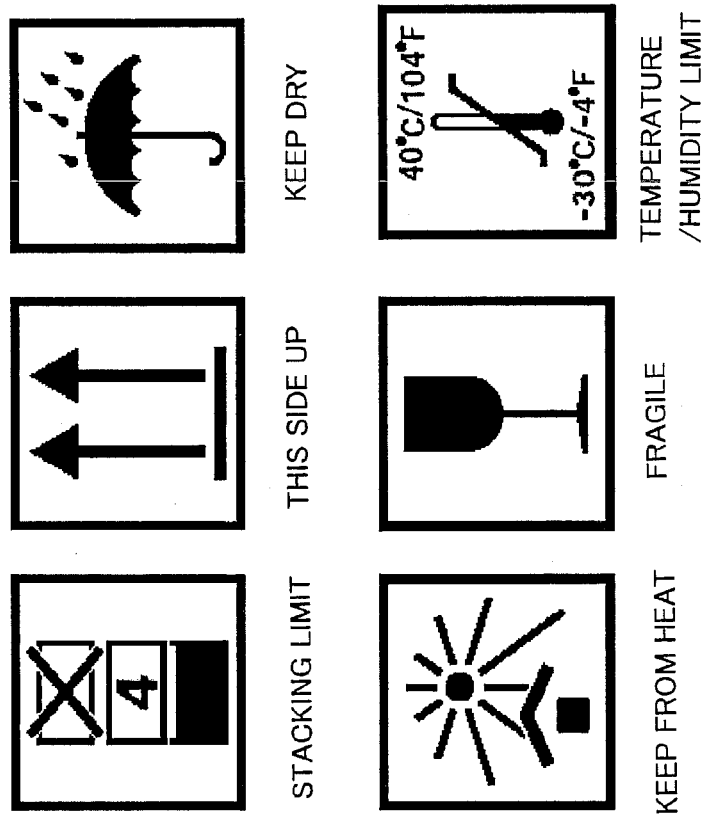
FIG. 23 shows examples of handling marks.

Taking a different viewpoint, the boxes of most products are printed with around five handling marks (refer to FIG. 23 for examples) and in actuality the cargo handlers do not have the leisure of confirming each mark while working. This embodiment provides an ideal method for clearly furnishing the minimum of information that must be observed to the worker.

Systems relating to this embodiment are given hereinafter in (1) to (14).

(1) A system where a tag that is attached to a product body or unit package container is recorded with product handling information (handling mark instruction) for either "fragile" or "this side up" or both.

(2) In a system of (1), a system where the reader and the warning device are integrated or separable devices and are worn by a cargo handler, and while the cargo handler holds the unit package container, the radio wave output value of the reader is set so that the tag that is attached to the product body or unit package container is within the communication range of the reader.

(3) In a system of (2), a system where the warning device is activated when the precaution information stored in the tag is received by the reader.

(4) In a system of (3), a system where the above-mentioned warning device emits any of the following: sound, vibration, light, or current for stimulation.

(5) In a system as in one of (2) to (4), a system where at least the antenna within the reader is provided within range of the radio wave, such as on the wrist, abdomen, waist, or head (within a helmet) of the cargo handler.

(6) In a system as in one of (2) to (5), a system where the reader and warning device, all or in part, are provided so as to be integrated with the work clothes of the cargo handler.

(7) In a system of (6), a system where an antenna is provided near a sleeve opening and a power supply and communication and processing module are provided so as not to hinder the cargo handler, such as on a shoulder, and where they are connected by cable.

(8) In a system of (6) or (7), a system where the warning device includes multiple LEDs and the multiple LEDs are arranged on the sleeve opening of the work clothes.

(9) In a system as in one of (2) to (8), a system including the reader and the warning device where at least the warning device is a light emitting type and arranged in work goggles so as not to obstruct the field of view of the cargo handler.

(10) In a system as in one of (2) to (9), a system where the reader outputs a variable signal (for example, two types of signals) in accordance with the strength of the received signal to the warning device. The significance of this system is as follows. Namely, since the cargo handler, or particularly delivery service personnel, simultaneously handles many packages and the handling precaution signals are received from nearby multiple packages, it can be supposed there are instances where it is difficult to judge if the package that is being held is the corresponding package. Accordingly, if two types of strengths are displayed, identification of the package becomes possible.

(11) In a system of (10), as the above-mentioned signal is received, a system where the warning device changes, in the case of LEDs, at least the number of lit LEDs, the light output intensity, or the blinking frequency; and in the case of sound, vibration, or current for stimulation, the warning device changes either or both the output intensity and warning interval.

(12) In a system as in one of (2) to (11), a system where RAM area is provided in the tag, a writer function is added to the reader, and the ID of the cargo handler and the handling date are recorded into the RAM area by the reader. It is preferable for the above-mentioned RAM area to be non-volatile or backed up by battery.

(13) In a system of (12), a system where multiple storage cells are provided in the RAM area of the tag, only one location can be written in the reader of the same cargo handler at the same time of day and a successively different cell is written for the operation of the same cargo operator at a different time of day and for the operation of a different operator, and rewriting or deletion are not allowed.

(14) In a system of (12) or (13), a system where the reader held by a cargo operator has a function for recording the ID of a handled product for which a warning was generated, this information is input by a host computer for total integrated management through a network on a certain periodical basis (for example, after the end of a work day), and as this operation completes the information recorded in the reader is deleted.

According to the above-mentioned systems of (1) to (14), since warnings, such as "do not stack fragile items on top of the truck cargo bay (to prevent impact due to the collapse of packages during shipment)" or "do not throw fragile items", are issued immediately prior to a task, tasks where "fragile items are stacked on top of the truck cargo bay or "fragile items are thrown" can be inhibited.

Furthermore, according to the system of (12) to (14), locations or workers (or worker can be identified if statistics are taken) where trouble occurs can be narrowed down to identify factors that need to be improved and the introduction of this system itself demonstrates an effect of inhibiting rough handling.

It should be understood that the present invention is not intended to be limited by the above-mentioned embodiments and various modifications may be made within the scope of and not deviate from the spirit of the invention.

EXAMPLE

An example of a relay antenna relating to this invention will be described hereinafter.

Figure 24:
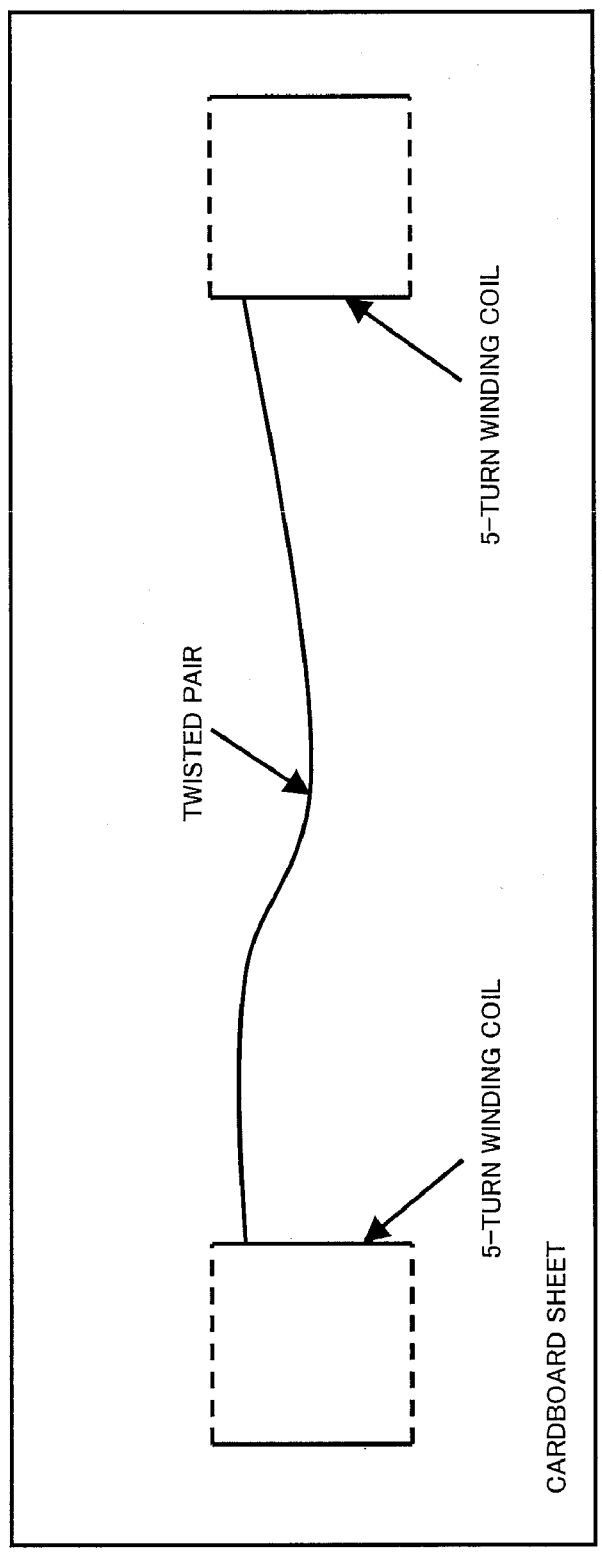
FIG. 24 is a schematic plan view of the relay antenna that was fabricated in the example.

FIG. 24 is a schematic plan view of the relay antenna that was fabricated in this example. In this example, as shown in FIG. 24, the relay antenna was fabricated on a cardboard sheet to include a pair of loop antennas and wires. Each of the pair of loop antennas has a 25 mm×25 mm substantially square shape and a 5-turn winding. Furthermore, the wires are twisted pair with a length of 170 mm. A tag is arranged in proximity to one loop antenna whereas a reader (coupler) is arranged in proximity to the other loop antenna. Here, the distance between the loop antenna for the relay antenna and the loop antenna for the tag and the distance between the loop antenna for the relay antenna and the loop antenna for the reader is approximately 1-2 mm. Then, when an interrogation signal is transmitted from the reader to the tag, the response signal from the tag could be received by the reader.

The entire disclosure of Japanese Patent Application No. 2005-062686 filed on Mar. 7, 2005 including specification, claims, drawings and abstract is incorporated herein by reference in its entirety.

What is claimed is:

1. An RFID relay antenna that is used in an RFID system including an RFID tag and an RFID reader that performs wireless communications with the RFID tag, the RFID relay antenna comprising:

at least one first loop antenna of that couples through electromagnetic induction with an antenna at the RFID tag;

a plurality of second loop antennas that are disposed apart from each other and each of which is disposed apart from the first loop antenna and that couples through electromagnetic induction with an antenna at the RFID reader or to a second RFID relay antenna; and a set of wires that connect the at least one first loop antenna and the plurality of second loop antennas so as to form one closed loop and that convey an induced current among the at least one first loop antenna and the plurality of second loop antennas.

2. An RFID system comprising:

an RFID tag;

an RFID reader performs wireless communications with the RFID tag; and an RFID relay antenna including at least one first loop antenna that couples through electromagnetic induction with an antenna at the RFID tag, a plurality of second loop antennas that are disposed apart from each other and each of which is disposed apart from the first loop antenna and each of which is disposed apart from the first loop antenna and couples through electromagnetic induction with an antenna at the RFID reader or to a second RFID relay antenna, and a set of wires that connect the at least one first loop antenna and the plurality of second loop antennas so as to form one closed loop and that convey an induced current generated among the at least one first loop antenna and plurality of second loop antennas.

3. A container that is capable of containing a product having an RFID tag attached thereto and that has a shape of a rectangular parallelepiped with six surfaces, the container comprising:

a first loop antenna that couples through electromagnetic induction with an antenna at the RFID tag;

one or more second loop antennas that are disposed apart from the first loop antenna; and a set of wires that connect the first loop antenna and the one or more second loop antennas so as to form one closed loop and that convey an induced current among the first loop antenna and the one or more second loop antennas;

wherein two or more loop antennas among the first loop antenna and the one or more second loop antennas are disposed on two or more surfaces of the six surfaces so as to couple through electromagnetic induction with an exterior antenna which is non-integral with the container.

4. A container according to claim 3, wherein:

the two or more surfaces on which the loop antennas are disposed include two mutually opposed surfaces (referred to hereinafter as inline arranged surfaces) of the six surfaces; and the loop antennas disposed on the inline arranged surfaces are disposed such that, when a plurality of the containers are arranged inline along a direction normal (referred to hereinafter as arrangement direction) to the inline arranged surfaces, the loop antennas disposed on inline arranged surfaces on both sides mutually adjacent face each other.

5. A container sequence, comprising:

a plurality of containers;

each container being capable of containing a product having an RFID tag attached thereto;

each container having a shape of a rectangular parallelepiped with six surfaces;

each container including, a first loop antenna that couples through electromagnetic induction with an antenna at the RFID tag, one or more second loop antennas that are disposed apart from the first loop antenna, and
a set of wires that connect the first loop antenna and the plurality of second loop antennas so as to form one closed loop and that convey an induced current among the first loop antenna and the one or more second loop antennas,
wherein two or more loop antennas among the first loop antenna and the one or more second loop antennas are disposed on two or more surfaces of the six surfaces so as to couple through electromagnetic induction with an exterior antenna which is non-integral with the container,
the two or more surfaces on which the loop antennas are disposed include two mutually opposed surfaces (referred to hereinafter as inline arranged surfaces) of the six surfaces,
the loop antennas disposed on the inline arranged surfaces are disposed such that, when a plurality of the containers are arranged inline along a direction normal (referred to hereinafter as arrangement direction) to the inline arranged surfaces, the loop antennas disposed on inline arranged surfaces on both sides mutually adjacent face each other, and
the plurality of containers in the container sequence are arranged inline with respect to each other the arrangement direction.

6. A communication confirmation method, comprising:
(a) disposing an RFID reader to face one end surface of a container sequence including a plurality of containers, each container being capable of containing a product having an RFID tag attached thereto, each container having a shape of a rectangular parallelepiped with six surfaces, each container including a first loop antenna that couples through electromagnetic induction with an antenna at the RFID tag, one or more second loop antennas that are disposed apart from the first loop antenna, and a set of wires that connect the first loop antenna and the one or more second loop antennas so as to form one closed loop and that convey an induced current among the first loop antenna and the one or more second loop antennas, wherein two or more loop antennas among the first loop antenna and the one or more second loop antennas are disposed on two or more surfaces of the six surfaces so as to couple electromagnetic induction with an exterior antenna which is non-integral with the container, the two or more surfaces on which the loop antennas are disposed include two mutually opposed surfaces (referred to hereinafter as inline arranged surfaces) of the six surfaces, the loop antennas disposed on the inline arranged surfaces are disposed such that, when a plurality of the containers are arranged inline along a direction normal (referred to hereinafter as arrangement direction) to the inline arranged surfaces, the loop antennas disposed on inline arranged surfaces on both sides mutually adjacent face each other, and the plurality of containers in the container sequence are arranged inline with respect to each other the arrangement direction;
(b) disposing a receiver for communication confirmation to face the other end surface of the container sequence; and
(c) judging the arrival or non-arrival of a signal from the RFID reader to each RFID tag included in the container sequence on the basis of whether a signal from the RFID reader is received by the receiver.

7. A communication confirmation method, comprising
(a) disposing an RFID reader to face one end surface of a container sequence including a plurality of containers, each container being capable of containing a product having an RFID tag attached thereto, each container having a shape of a rectangular parallelepiped with six surfaces, each container including a first loop antenna that couples through electromagnetic induction with an antenna at the RFID tag, one or more second loop antennas that are disposed apart from the first loop antenna, and a set of wires that connect the first loop antenna and the one or more second loop antennas so as to form one closed loop and that convey an induced current among the first loop antenna and the one or more second loop antennas, wherein two or more loop antennas among the first loop antenna and the one or more second loop antennas are disposed on two or more surfaces of the six surfaces so as to couple induction with an exterior antenna which is non-integral with the container, the two or more surfaces on which the loop antennas are disposed include two mutually opposed surfaces (referred to hereinafter as inline arranged surfaces) of the six surfaces, the loop antennas disposed on the inline arranged surfaces are disposed such that, when a plurality of the containers are arranged inline along a direction normal (referred to hereinafter as arrangement direction) to the inline arranged surfaces, the loop antennas disposed on inline arranged surfaces on both sides mutually adjacent face each other, and the plurality of containers in the container sequence are arranged inline with respect to each other the arrangement direction;
(b) disposing a transponder for communication confirmation to face the other end surface of the container sequence; and
(c) judging the arrival or non-arrival of a signal from the RFID reader to each RFID tag included in the container sequence on the basis of whether a response signal of the transponder in response to a signal from the RFID reader is received by the RFID reader.

8. An arrangement structure of containers, comprising:
a first container sequence;
said first container sequence including a plurality of containers, each container being capable of containing a product having an RFID tag attached thereto, each container having a shape of a rectangular parallelepiped with six surfaces;
each container in the first container sequence including,
a first loop antenna that couples through electromagnetic induction with an antenna at the RFID tag,
one or more second loop antennas that are disposed apart from the first loop antenna, and
a set of wires that connect the first loop antenna and the one or more second loop antennas so as to form one closed loop and that convey an induced current among the first loop antenna and the one or more second loop antennas, wherein two or more loop antennas among the first loop antenna and the one or more second loop antennas are disposed on two or more surfaces of the six surfaces so as to couple through electromagnetic induction with an exterior antenna which is non-integral with the container, the two or more surfaces on which the loop antennas are disposed include two mutually opposed surfaces (referred to hereinafter as inline arranged surfaces) of the six surfaces, the loop antennas disposed on the inline arranged surfaces are disposed such that, when a plurality of the containers are arranged inline along a direction normal (referred to hereinafter as arrangement direction) to the inline arranged surfaces, the loop antennas disposed on inline arranged surfaces on both sides mutually adjacent face each other, and the plurality of containers in the container sequence are arranged inline with respect to each other the arrangement direction;

a second container sequence disposed parallel to the first container sequence;

said second container sequence including a plurality of containers, each container being capable of containing a product having an RFID tag attached thereto, each container having a shape of a rectangular parallelepiped with six surfaces;

each container in the second container sequence including, a first loop antenna that couples through electromagnetic induction with an antenna at the RFID tag, one or more second loop antennas that are disposed apart from the first loop antenna, and a set of wires that connect the first loop antenna and the one or more second loop antennas so as to form one closed loop and that convey an induced current among the first loop antenna and the one or more second loop antennas, wherein two or more loop antennas among the first loop antenna and the one or more second loop antennas are disposed on two or more surfaces of the six surfaces so as to couple through electromagnetic induction with an exterior antenna which is non-integral with the container, the two or more surfaces on which the loop antennas are disposed include two mutually opposed surfaces (referred to hereinafter as inline arranged surfaces) of the six surfaces, the loop antennas disposed on the inline arranged surfaces are disposed such that, when a plurality of the containers are arranged inline along a direction normal (referred to hereinafter as arrangement direction) to the inline arranged surfaces, the loop antennas disposed on inline arranged surfaces on both sides mutually adjacent face each other, and the plurality of containers in the container sequence are arranged inline with respect to each other the arrangement direction; and a U-turn antenna installed at a location facing one end surface of the first and second container sequences;

wherein the U-turn antenna has a pair of loop antennas that are disposed to face the one end surface of each of the first and second container sequences and that couple through electromagnetic induction with the loop antenna installed on each of the one end surfaces and a set of wires that connect the pair of loop antennas so as to form one closed loop and that convey an induced current between the pair of loop antennas.

9. A communication confirmation method, comprising:

(a) disposing an RFID reader relative to an arrangement structure of containers, the arrangement structure including, a first container sequence including a plurality of containers, each container being capable of containing a product having an RFID tag attached thereto, each container having a shape of a rectangular parallelepiped with six surfaces, each container in the first container sequence including a first loop antenna that couples through electromagnetic induction with an antenna at the RFID tag, one or more second loop antennas that are disposed apart from the first loop antenna, and a set of wires that connect the first loop antenna and the one or more second loop antennas so as to form one closed loop and that convey an induced current among the first loop antenna and the one or more second loop antennas, wherein two or more loop antennas among the first loop antenna and the one or more second loop antennas are disposed on two or more surfaces of the six surfaces so as to couple through electromagnetic induction with an exterior antenna which is non-integral with the container, the two or more surfaces on which the loop antennas are disposed include two mutually opposed surfaces (referred to hereinafter as inline arranged surfaces) of the six surfaces, the loop antennas disposed on the inline arranged surfaces are disposed such that, when a plurality of the containers are arranged inline along a direction normal (referred to hereinafter as arrangement direction) to the inline arranged surfaces, the loop antennas disposed on inline arranged surfaces on both sides mutually adjacent face each other, and the plurality of containers in the container sequence are arranged inline with respect to each other the arrangement direction, a second container sequence disposed parallel to the first container sequence, the second container sequence including a plurality of containers, each container being capable of containing a product having an RFID tag attached thereto, each container having a shape of a rectangular parallelepiped with six surfaces, each container in the second container sequence including a first loop antenna that couples through electromagnetic induction with an antenna at the RFID tag, one or more loop antennas that are disposed apart from the first loop antenna, and a set of wires that connect the first loop antenna and the one or more second loop antennas so as to form one closed loop and that convey an induced current among the first loop antenna and the one or more second loop antennas, wherein two or more loop antennas among the first loop antenna and the one or more second loop antennas are disposed on two or more surfaces of the six surfaces so as to couple through electromagnetic induction with an exterior antenna which is non-integral with the container, the two or more surfaces on which the loop antennas are disposed include two mutually opposed surfaces (referred to hereinafter as inline arranged surfaces) of the six surfaces, the loop antennas disposed on the inline arranged surfaces are disposed such that, when a plurality of the containers are arranged inline along a direction normal (referred to hereinafter as arrangement direction) to the inline arranged surfaces, the loop antennas disposed on inline arranged surfaces on both sides mutually adjacent face each other, and the plurality of containers in the container sequence are arranged inline with respect to each other the arrangement direction, a U-turn antenna installed at a location facing one end surface of the first and second container sequences, the U-turn antenna having a pair of loop antennas that are disposed to face the one end surface of each of the first and second container sequences and that couple through electromagnetic induction with the loop antenna installed on each of the one end surfaces and a set of wires that connect the pair of loop antennas so as to form one closed loop and that convey an induced current between the pair of loop antennas, wherein the RFID reader is disposed such that the RFID reader face the other end surface of one container sequence of the first and second container sequences;

(b) disposing a receiver for communication confirmation to face the other end surface of the other container sequence of the first and second container sequences; and (c) judging the arrival or non-arrival of a signal from the RFID reader to each RFID tag included in the first and second container sequences on the basis of whether a signal from the RFID reader is received by the receiver.

10. A communication confirmation method, comprising:

(a) disposing an RFID reader relative to an arrangement structure of containers, the arrangement structure including, a first container sequence including a plurality of containers, each container being capable of containing a product having an RFID tag attached thereto, each container having a shape of a rectangular parallelepiped with six surfaces, each container in the first container sequence including a first loop antenna that couples through electromagnetic induction with an antenna at the RFID tag, one or more second loop antennas that are disposed apart from the first loop antenna, and a set of wires that connect the first loop antenna and the one or more second loop antennas so as to form one closed loop and that convey an induced current among the first loop antenna and the one or more second loop antennas, wherein two or more loop antennas among the first loop antenna and the one or more second loop antennas are disposed on two or more surfaces of the six surfaces so as to couple through electromagnetic induction with an exterior antenna which is non-integral with the container, the two or more surfaces on which the loop antennas are disposed include two mutually opposed surfaces (referred to hereinafter as inline arranged surfaces) of the six surfaces, the loop antennas disposed on the inline arranged surfaces are disposed such that, when a plurality of the containers are arranged inline along a direction normal (referred to hereinafter as arrangement direction) to the inline arranged surfaces, the loop antennas disposed on inline arranged surfaces on both sides mutually adjacent face each other, and the plurality of containers in the container sequence are arranged inline with respect to each other the arrangement direction, a second container sequence disposed parallel to the first container sequence, the second container sequence including a plurality of containers, each container being capable of containing a product having an RFID tag attached thereto, each container having a shape of a rectangular parallelepiped with six surfaces, each container in the second container sequence including a first loop antenna that couples through electromagnetic induction with an antenna at the RFID tag, one or more loop antennas that are disposed apart from the first loop antenna, and a set of wires that connect the first loop antenna and the one or more second loop antennas so as to form one closed loop and that convey an induced current among the first loop antenna and the one or more second loop antennas, wherein two or more loop antennas among the first loop antenna and the one or more second loop antennas are disposed on two or more surfaces of the six surfaces so as to couple through electromagnetic induction with an exterior antenna which is non-integral with the container, the two or more surfaces on which the loop antennas are disposed include two mutually opposed surfaces (referred to hereinafter as inline arranged surfaces) of the six surfaces, the loop antennas disposed on the inline arranged surfaces are disposed such that, when a plurality of the containers are arranged inline along a direction normal (referred to hereinafter as arrangement direction) to the inline arranged surfaces, the loop antennas disposed on inline arranged surfaces on both sides mutually adjacent face each other, and the plurality of containers in the container sequence are arranged inline with respect to each other the arrangement direction, a U-turn antenna installed at a location facing one end surface of the first and second container sequences, the U-turn antenna having a pair of loop antennas that are disposed to face the one end surface of each of the first and second container sequences and that couple through electromagnetic induction with the loop antenna installed on each of the one end surfaces and a set of wires that connect the pair of loop antennas so as to form one closed loop and that convey an induced current between the pair of loop antennas, wherein the RFID reader is disposed such that the RFID reader face the other end surface of one container sequence of the first and second container sequences;

(b) disposing a transponder for communication confirmation to face the other end surface of the other container sequence of the first and second container sequences; and (c) judging the arrival or non-arrival of a signal from the RFID reader to each RFID tag included in the first and second container sequences on the basis of whether a response signal of the transponder in response to a signal from the RFID reader is received by the RFID reader.

11. A container according to claim 3, wherein:

the two or more surfaces on which the loop antennas are disposed include two adjacent surfaces (referred to hereinafter as loop arranged surfaces) and another surface (referred to hereinafter as an access surface) of the six surfaces; and the loop antennas disposed on the loop arranged surfaces are disposed such that when four of the containers are arranged in a square loop configuration so that the loop arranged surfaces are mutually adjacent between the containers, the loop antennas that are disposed on the loop arranged surfaces of both mutually adjacent sides face each other.

12. An arrangement structure of containers comprising:

four containers; and a shield member;

each container being capable of containing a product having an RFID tag attached thereto;

each container having a shape of a rectangular parallelepiped with six surfaces;

each container including, a first loop antenna that couples through electromagnetic induction with an antenna at the RFID tag, one or more second loop antennas that are disposed apart from the first loop antenna, and a set of wires that connect the first loop antenna and the one or more second loop antennas so as to form one closed loop and that convey an induced current among the first loop antenna and the one or more second loop antennas, wherein two or more loop antennas among the first loop antenna and the one or more second loop antennas are disposed on two or more surfaces of the six surfaces so as to couple through electromagnetic induction with an exterior antenna which is non-integral with the container;

the two or more surfaces on which the second loop antennas are disposed include two adjacent surfaces (referred to hereinafter as loop arranged surfaces) and another surface (referred to hereinafter as an access surface) of the six surfaces;

the loop antennas disposed on the loop arranged surfaces are disposed such that, when four of the containers are arranged in a square loop configuration so that the loop arranged surfaces are mutually adjacent between the containers, the loop antennas that are disposed on the loop arranged surfaces of both mutually adjacent sides face each other;

said four containers being arranged in a square loop configuration so that the loop arranged surfaces are mutually adjacent between the containers;

said shield member being installed on one of four locations where the loop arranged surfaces are mutually adjacent so as to prevent electromagnetic induction coupling between loop antennas.

13. A container according to claim 3, wherein: the two or more surfaces on which the loop antennas are disposed include two adjacent surfaces (referred to hereinafter as loop arranged surfaces) of the six surfaces; and the loop antennas disposed on the loop arranged surfaces are disposed such that when four of the containers are arranged in a square loop configuration so that the loop arranged surfaces between the containers are mutually adjacent at three locations and not adjacent at one location, the loop antennas that are disposed on the surfaces of both mutually adjacent sides face each other.

14. An arrangement structure of containers comprising:

four containers;

each container being capable of containing a product having an RFID tag attached thereto;

each container having a shape of a rectangular parallelepiped with six surfaces;

each container including, a first loop antenna that couples through electromagnetic induction with an antenna at the RFID tag, one or more second loop antennas that are disposed apart from the first loop antenna, and a set of wires that connect the first loop antenna and the one or more second loop antennas so as to form one closed loop and that convey an induced current among the first loop antenna and the one or more second loop antennas, wherein two or more loop antennas among the first loop antenna and the one or more second loop antennas are disposed on two or more surfaces of the six surfaces so as to couple through electromagnetic induction with an exterior antenna which is non-integral with the container;

the two or more surfaces on which the loop antennas are disposed include two adjacent surfaces (referred to hereinafter as loop arranged surfaces) of the six surfaces;

the loop antennas disposed on the loop arranged surfaces are disposed such that, when four of the containers are arranged in a square loop configuration so that the loop arranged surfaces are mutually adjacent between the containers, the loop antennas that are disposed on the loop arranged surfaces of both mutually adjacent sides face each other;

said four containers being arranged in a square loop configuration so that the loop arranged surfaces between the containers are mutually adjacent at three locations and not adjacent at one location.

15. An arrangement structure of containers comprising:

M×N (where M and N are integers of 2 or greater) containers, each of which has a shape of a rectangular parallelepiped with six surfaces, which is capable of containing a product having an RFID tag attached thereto and which has a loop antenna at the RFID tag installed on a predetermined surface (referred to hereafter as antenna installed surface) among the six surfaces, and arranged in a matrix configuration of M rows and N columns along a plane in parallel with the antenna installed surface; and a relay antenna sheet installed at a location to face the antenna installed surfaces of the M×N containers;

said relay antenna sheet including, a sheet member that includes a first region overlapping the antenna installed surfaces of the M×N containers and a second region that is provided outside the first region;

M×N first loop antennas arranged on the first region in a matrix configuration of M rows and N columns to couple through electromagnetic induction with each loop antenna installed on the antenna installed surface of each of the containers;

M×N second loop antennas that are disposed on the second region to respectively pair with the first loop antennas and to couple through electromagnetic induction with the loop antenna at the RFID reader; and M×N sets of wires provided for each pair of the loop antennas to connect the first loop antenna and the second loop antenna so as to form one closed loop.

* * * * *